United States Patent
Lim et al.

(10) Patent No.: US 11,032,608 B2
(45) Date of Patent: Jun. 8, 2021

(54) MOBILE TERMINAL AND CONTROL METHOD THEREFOR

(71) Applicant: LG ELECTRONICS INC., Seoul (KR)

(72) Inventors: Hongjae Lim, Seoul (KR); Gak Yang, Seoul (KR); Hongsik Jo, Seoul (KR); Jaeyuel Im, Seoul (KR); Dongsoo Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 288 days.

(21) Appl. No.: 16/082,243

(22) PCT Filed: Mar. 10, 2016

(86) PCT No.: PCT/KR2016/002412
§ 371 (c)(1),
(2) Date: Sep. 4, 2018

(87) PCT Pub. No.: WO2017/155140
PCT Pub. Date: Sep. 14, 2017

(65) Prior Publication Data
US 2020/0092605 A1    Mar. 19, 2020

(30) Foreign Application Priority Data
Mar. 8, 2016 (KR) .................. 10-2016-0027660

(51) Int. Cl.
*H04N 21/2347* (2011.01)
*H04N 21/422* (2011.01)
(Continued)

(52) U.S. Cl.
CPC ..... *H04N 21/4415* (2013.01); *G06K 9/00087* (2013.01); *H04N 21/41407* (2013.01);
(Continued)

(58) Field of Classification Search
None
See application file for complete search history.

(56) References Cited

U.S. PATENT DOCUMENTS

2015/0234507 A1* 8/2015 Chun .................... G06F 1/1616
345/173
2015/0288681 A1* 10/2015 Park ...................... H04W 12/06
726/6
(Continued)

FOREIGN PATENT DOCUMENTS

JP    2007-293719 A    11/2007
KR    10-2013-0120367 A    11/2013
(Continued)

*Primary Examiner* — Brian T Pendleton
*Assistant Examiner* — Jean D Saint Cyr
(74) *Attorney, Agent, or Firm* — Birch, Stewart, Kolasch & Birch, LLP

(57) ABSTRACT

The present invention relates to a mobile terminal and a control method therefor and, more specifically, to a method for configuring a security section of video content when a mobile terminal senses an input signal corresponding to registered fingerprint information. In order to achieve the aforementioned objective or another objective, the mobile terminal according to one aspect of the present invention comprises: a display unit; a memory; a sensing unit for sensing a fingerprint input; and a control unit, wherein the control unit senses a first input signal when first video content is outputted, extracts the first fingerprint information from the first input signal, and configures the security section of the first video content when the first fingerprint information corresponds to the registered fingerprint information, and the security section is a section in which at least a part of the first video content is encrypted on the basis of the time at which the sensing of the first input signal is maintained.

17 Claims, 18 Drawing Sheets

(51) Int. Cl.
*H04N 21/4223* (2011.01)
*H04N 21/442* (2011.01)
*H04N 21/454* (2011.01)
*H04N 21/4415* (2011.01)
*G06K 9/00* (2006.01)
*H04N 21/414* (2011.01)
*H04N 21/431* (2011.01)
*H04N 21/4408* (2011.01)
*H04N 21/835* (2011.01)

(52) U.S. Cl.
CPC ..... *H04N 21/4223* (2013.01); *H04N 21/4312* (2013.01); *H04N 21/4408* (2013.01); *H04N 21/835* (2013.01)

(56) References Cited

U.S. PATENT DOCUMENTS

2016/0247144 A1* 8/2016 Oh ..................... G06Q 20/321
2016/0321496 A1* 11/2016 Mather .............. G06K 9/00067
2017/0337542 A1* 11/2017 Kim ........................ G06F 3/048

FOREIGN PATENT DOCUMENTS

| KR | 10-2015-0029251 A | 3/2015 |
| KR | 10-2015-0087667 A | 7/2015 |
| KR | 10-2015-0110400 A | 10/2015 |
| KR | 10-1751566 B1 | 6/2017 |

\* cited by examiner

FIG. 6
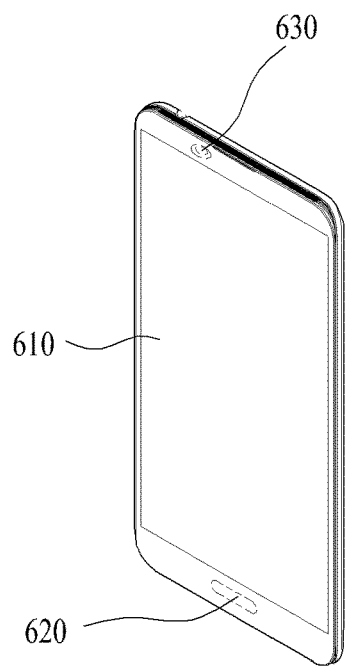
(a)
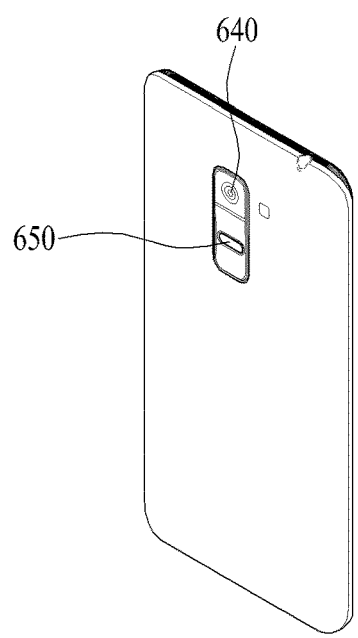
(b)

FIG. 8
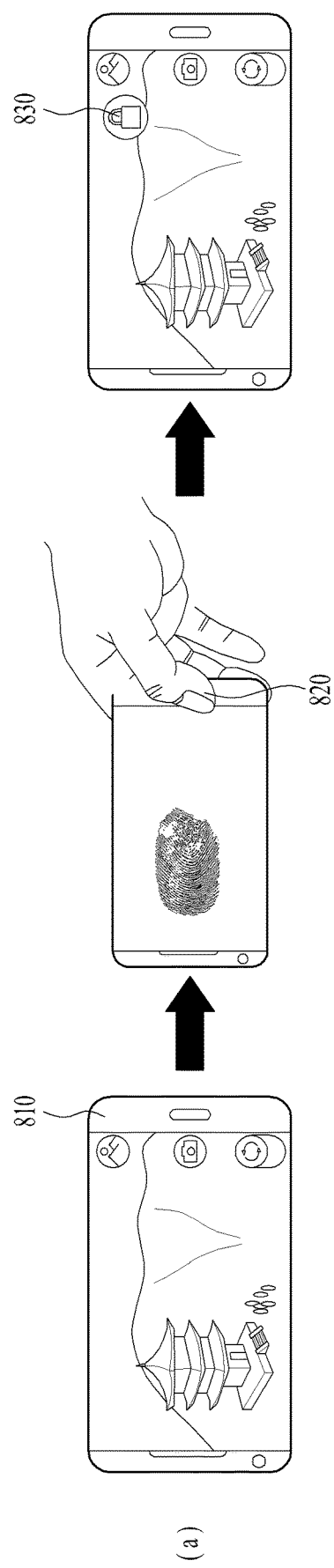
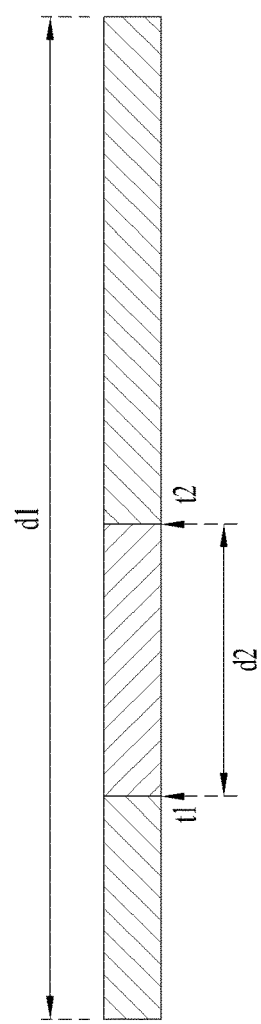

MOBILE TERMINAL AND CONTROL METHOD THEREFOR

CROSS REFERENCE TO RELATED APPLICATIONS

This application is the National Phase of PCT International Application No. PCT/KR2016/002412, filed on Mar. 10, 2016, which claims priority under 35 U.S.C. 119(a) to Patent Application No. 10-2016-0027660, filed in the Republic of Korea on Mar. 8, 2016, all of which are hereby expressly incorporated by reference into the present application.

TECHNICAL FIELD

The present invention relates to a mobile terminal and control method thereof, and more particularly, to a method of setting up a security section of a video content in case of sensing an input signal corresponding to a registered fingerprint information in a mobile terminal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

As functions of the terminal are getting diversified, the terminal tends to be implemented as a multimedia player provided with complex functions such as photographing of photos or videos, playback of music or video files, game play, broadcast reception and the like for example.

Efforts are ongoing to support and increase the functionality of mobile terminals. Such efforts include software and hardware improvements, as well as changes and improvements in the structural components.

Meanwhile, a mobile terminal becomes a personal necessity in the modern society, whereby the demand for security of a mobile terminal to protect individual's privacy is rising.

Moreover, a method for configuring security for a partial section in the course of playing or shooting a video content may be requested.

DISCLOSURE OF THE INVENTION

Technical Task

The present invention is intended to solve the above problem and other problems. One technical task of the present invention is to provide a mobile terminal and control method thereof, by which a security section is set up when a registered fingerprint is inputted in the course of shooting and editing a video content.

Another technical task of the present invention is to provide a mobile terminal and control method thereof, by which a video content including a security section is provided when a registered fingerprint is inputted in the course of playing and attaching a security section set video content.

Technical Solutions

In one technical aspect of the present invention, provided herein is a mobile terminal, including a display unit, a memory, a sensing unit, and a controller configured to sense a first input signal in a state that a first video content is outputted, extract a first fingerprint information from the first input signal, and set up a security section of the first video content if the first fingerprint information corresponds to a registered fingerprint information, wherein the security section comprises a section in which at least one portion of the first video content is encrypted based on a time for maintaining the sensing of the first input signal.

According to one aspect of the present invention, the mobile terminal may further include a first camera configured to shoot a video and the first video content may correspond to a preview video shot through the first camera.

According to one aspect of the present invention, if the security section is set up, the controller may display a security indicator while the security section is maintained.

According to one aspect of the present invention, the mobile terminal may further include a second camera configured to sense user's eyes. If the first input signal corresponds to a preset touch input, the controller may sense a second input signal. The second input signal may correspond to a signal generated based on the user's eyes. And, the controller may set up the security section while the second input signal is sensed.

According to one aspect of the present invention, if the second input signal is sensed, while the second input signal is sensed in a state that the first input signal is not maintained, the controller may set up the security section.

According to one aspect of the present invention, while a second video content including at least one menu for editing the first video content is outputted, the controller may sense the first input signal. And, the first video content may correspond to a video stored in the memory.

According to one aspect of the present invention, the at least one menu for editing the first video content may include a timeline.

According to one aspect of the present invention, if the first fingerprint information corresponds to the registered fingerprint information, the controller may sense a third input signal for the timeline and set up a security section based on a position at which the third input signal is sensed.

According to one aspect of the present invention, while at least one thumbnail corresponding to a video stored in the memory is outputted, the controller may sense a fourth input signal. The at least one thumbnail may include a thumbnail indicating a section except the security section in the first video content. The controller may extract a second fingerprint information from the fourth input signal. If the second fingerprint information corresponds to a registered fingerprint information, the controller may output a thumbnail indicating a section except the security section of the first video content and a thumbnail indicating the security section of the first video content.

According to one aspect of the present invention, if the fourth input signal corresponds to a preset touch input, the controller may sense a fifth input signal. The fifth input signal may correspond to a signal generated based on the user's eyes. While the fifth input signal is sensed, the controller may output the thumbnail indicating the section except the security section of the first video content and the thumbnail indicating the security section of the first video content.

According to one aspect of the present invention, before the first video content in which the security section is set up is played, if a sixth input signal is sensed, the controller may extract a third fingerprint information from the sixth input signal. If the third fingerprint information corresponds to the registered fingerprint information, the controller may play the first video content including the security section. If the third fingerprint information does not correspond to the registered fingerprint information, the controller may play the first video content except the security section.

According to one aspect of the present invention, while the first video content in which the security section is set up is played, if a seventh input signal is sensed, the controller may extract a fourth fingerprint information from the seventh input signal. If the fourth fingerprint information corresponds to the registered fingerprint information, the controller may play the first video content including the security section. If the fourth fingerprint information does not correspond to the registered fingerprint information, the controller may play the first video content except the security section.

According to one aspect of the present invention, if the sixth or seventh input signal corresponds to a preset touch input, the controller may sense an eighth input signal. The eighth input signal may correspond to a signal generated based on the user's eyes. While the eight input signal is sensed, the controller may play the first video content including the security section.

According to one aspect of the present invention, the mobile terminal may further include a wireless communication unit transmitting and receiving contents with an external device. While at least one thumbnail corresponding to a video stored in the memory is outputted, the controller may sense a ninth input signal. The at least one thumbnail may include a thumbnail indicating the security section of the first video content and a thumbnail indicating a section except the security section of the first video content. If the ninth input signal selects the thumbnail indicating the security section of the first video content, the controller may transmit the first video content including the security section to the external device. If the ninth input signal selects the thumbnail indicating the section except the security section of the first video content, the controller may transmit the first video content except the security section to the external device.

In another technical aspect of the present invention, provided herein is a method of controlling a mobile terminal, including sensing a first input signal in a state that a first video content is outputted, extracting a first fingerprint information from the first input signal, and setting up a security section of the first video content if the first fingerprint information corresponds to a registered fingerprint information, wherein the security section comprises a section in which at least one portion of the first video content is encrypted based on a time for maintaining the sensing of the first input signal.

Advantageous Effects

Effects and/or advantages of a mobile terminal and control method thereof according to the present invention are described as follows.

According to at least one of embodiments of the present invention, when a video content is shot or edited, a security configuration of a user-desired section can be advantageously performed through simple fingerprint recognition.

According to at least one of embodiments of the present invention, when a security section set-up video content is played or attached, a content can be advantageously provided in a manner of containing or excluding a security section through fingerprint recognition.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 6 is a diagram for one example of a mobile terminal related to the present invention.

FIG. 8 is a diagram to describe an example of setting up a security section when shooting a video content according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
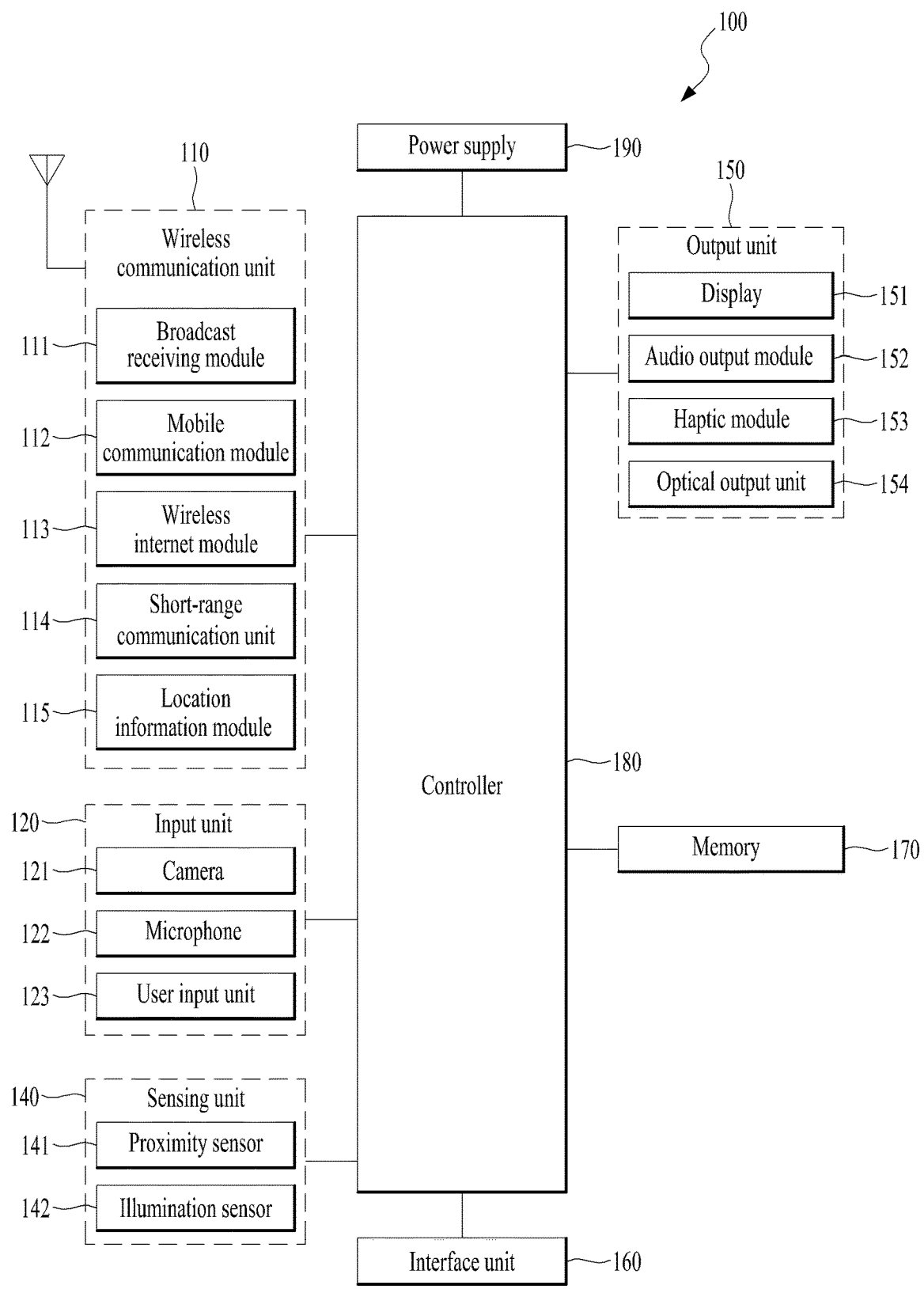
FIG. 1A is a block diagram of a mobile terminal in accordance with the present disclosure.
Figure 1B:
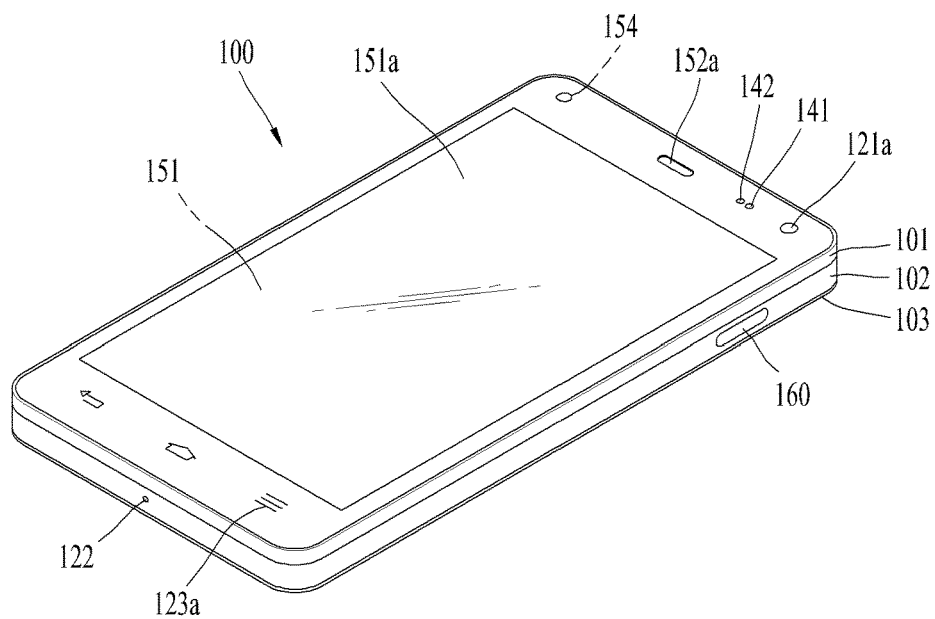
FIGS. 1B and 1C are conceptual views of one example of the mobile terminal, viewed from different directions.
Figure 1C:
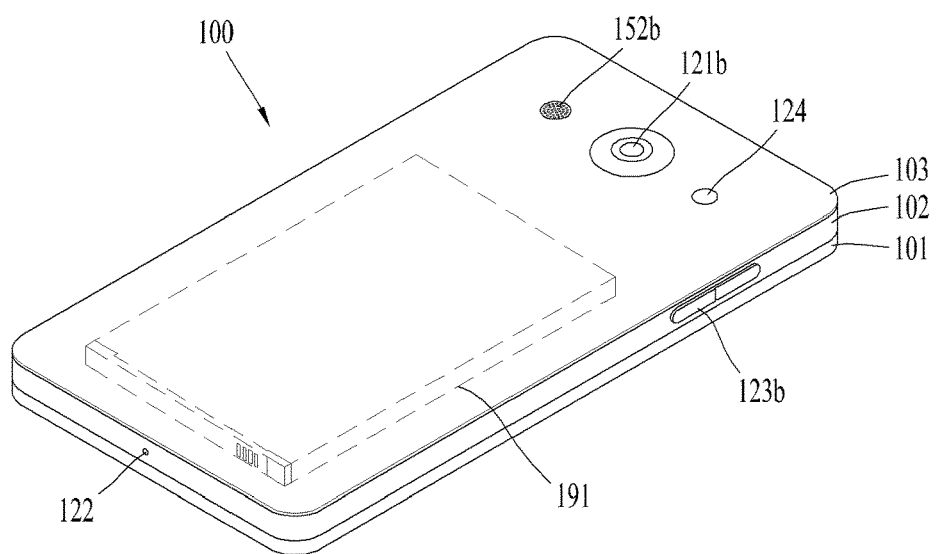

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display 151, the 1st audio output unit 152a, the 2nd audio output unit 152b, the proximity sensor 141, the illumination sensor 142, the optical output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
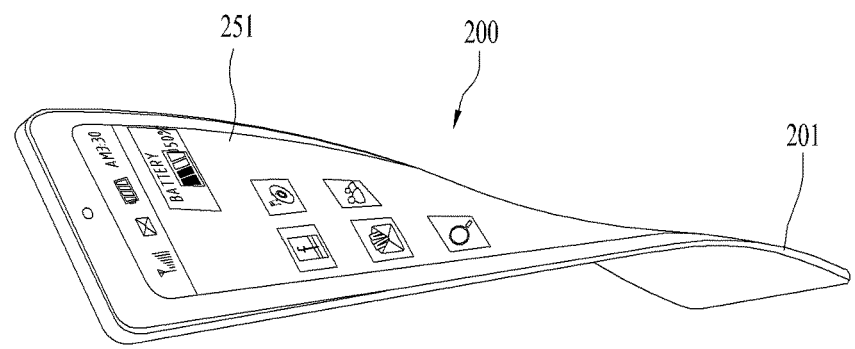
FIG. 2 is a conceptual diagram to describe another example of a deformable mobile terminal 200 according to the present disclosure.

FIG. 2 is a conceptual diagram to describe another example of a deformable mobile terminal 200 according to the present disclosure.

In this figure, mobile terminal 200 is shown having display unit 20, which is a type of display that is deformable by an external force. This deformation, which includes display unit 20 and other components of mobile terminal 200, may include any of curving, bending, folding, twisting, rolling, and combinations thereof. The deformable display unit 20 may also be referred to as a "flexible display unit."

In some implementations, the flexible display unit 20 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 20 is not deformed (for example, in a state with an infinite radius of curvature and referred to as a first state), a display region of the flexible display unit 20 includes a generally flat surface. When in a state that the flexible display unit 20 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel)

arranged in a matrix configuration is controlled independently. The unit pixel denotes an elementary unit for representing one color.

According to one alternative embodiment, the first state of the flexible display unit 20 may be a curved state (for example, a state of being curved from up to down or from right to left), instead of being in flat state. In this embodiment, when an external force is applied to the flexible display unit 20, the flexible display unit 20 may transition to the second state such that the flexible display unit is deformed into the flat state (or a less curved state) or into a more curved state.

If desired, the flexible display unit 20 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 20. The deformation sensor may be included in the sensing unit 140.

The deformation sensor may be located in the flexible display unit 20 or the case 201 to sense information related to the deforming of the flexible display unit 20. Examples of such information related to the deforming of the flexible display unit 20 may be a deformed direction, a deformed degree, a deformed position, a deformed amount of time, an acceleration that the deformed flexible display unit 20 is restored, and the like. Other possibilities include most any type of information which can be sensed in response to the curving of the flexible display unit or sensed while the flexible display unit 20 is transitioning into, or existing in, the first and second states.

In some embodiments, the controller 180 or other component can change information displayed on the flexible display unit 20, or generate a control signal for controlling a function of the mobile terminal 200, based on the information related to the deforming of the flexible display unit 20. Such information is typically sensed by the deformation sensor.

The mobile terminal 200 is shown having a case 10 for accommodating the flexible display unit 20. The case 10 can be deformable together with the flexible display unit 20, taking into account the characteristics of the flexible display unit 20.

A battery (not shown in this figure) located in the mobile terminal 200 may also be deformable in cooperation with the flexible display unit 20, taking into account the characteristic of the flexible display unit 20. One technique to implement such a battery is to use a stack and folding method of stacking battery cells.

The deformation of the flexible display unit 20 not limited to perform by an external force. For example, the flexible display unit 20 can be deformed into the second state from the first state by a user command, application command, or the like.

Meanwhile, beyond using a mobile terminal grabbed with a user's hand, the mobile terminal may extend to a wearable device that is wearable on a user body. Examples of the wearable device include a smart watch, a smart glass, a head mounted display (HMD), and the like. Examples of the mobile terminal extending to the wearable devices shall be described as follows.

A wearable device can exchange data with (or interwork with) another mobile terminal 100. The short-range communication module 114 can sense or recognize a nearby wearable device capable of communicating with the mobile terminal 100. Moreover, if the sensed wearable device is a device authenticated to communicate with the mobile terminal 100, the controller 180 may transmit at least one portion of the data processed in the mobile terminal 100 to the wearable device via the short-range communication module 114, for example. Hence, a user can use the data processed in the mobile terminal 100 through the wearable device. For example, when an incoming call is received by the mobile terminal 100, the user can answer the incoming call through the wearable device. When a message is received by the mobile terminal 100, the user can check the received message through the wearable device.

Figure 3:
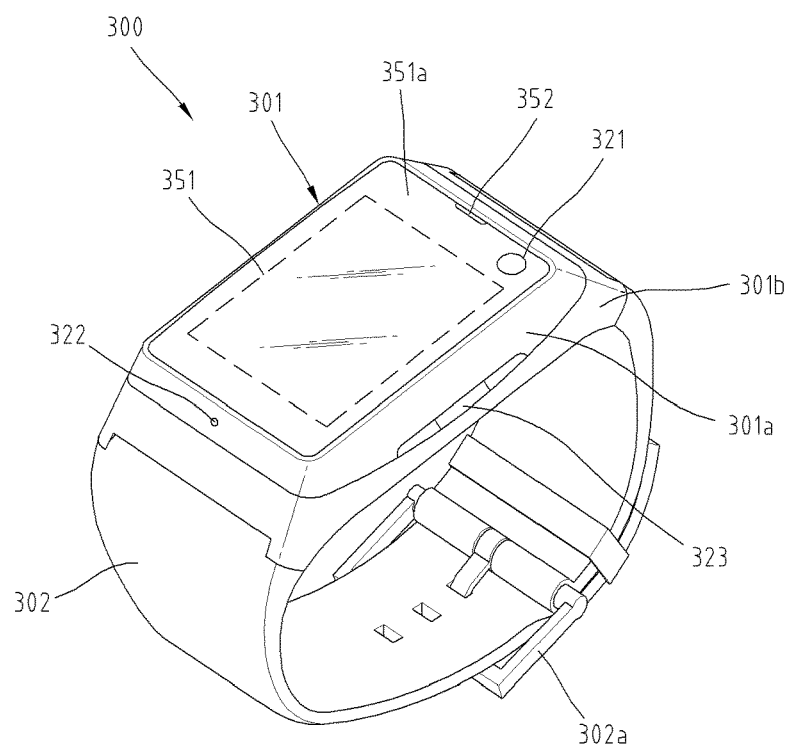
FIG. 3 is a perspective diagram for one example of a watch type mobile terminal 300 related to another embodiment of the present invention.

FIG. 3 is a perspective diagram for one example of a watch type mobile terminal 300 related to another embodiment of the present invention.

Referring to FIG. 3, a mobile terminal 300 of a watch type may include a main body 301 having a display unit 351 and a band 302 connected to the main body 301 to be wearable on a wrist. In general, the mobile terminal 300 may be configured to include features that are the same or similar to those of the former mobile terminal 100 shown in FIGS. 1A to 1C.

The main body 301 may include a case forming a certain appearance or exterior. As illustrated, the case may include a $1^{st}$ case 301a and a $2^{nd}$ case 301b configured to cooperatively provide an inner space for accommodating various electronic components therein, by which the present invention is non-limited. For instance, a single case is configured to provide the inner space, thereby embodying the mobile terminal 300 of a uni-body type.

The watch type mobile terminal 300 is configured to perform wireless communication, and an antenna for the wireless communication can be installed in the main body 301. It is able to expand performance of the antenna using the case. For example, a case containing a conductive material is electrically connected to the antenna to extend a ground region or a radiation region.

The display unit 351 is disposed on the front side of the main body 301 so as to output information. The display unit 351 is provided with a touch sensor so as to be embodied into a touchscreen. As illustrated, a window 351a of the display unit 251 is mounted on the $1^{st}$ case 301a to form a front surface of the terminal body together with the $1^{st}$ case 301a.

The main body 301 may be provided with an audio output unit 352, a camera 321, a microphone 322, a user input unit 323 and the like. In case that the display unit 351 is embodiment into the touchscreen, it can function as a user input unit 323. Hence, a separate key may not be provided to the main body 301.

The band 302 is configured to be worn on a wrist by enclosing the wrist. And, the band 302 may be formed of a flexible material for facilitating the wearing of the device. As one example, the band 302 may be made of leather, rubber, silicon, synthetic resin, and/or the like. As the band 302 is configured detachable from the main body 301, the band 302 may be substituted with various types of bands according to a user's preference.

Meanwhile, the band 302 may be used to expand the performance of the antenna. For example, a ground extending portion (not shown in the drawing) for extending a ground region by being electrically connected to the antenna may be built in the band 302.

The band 302 may include a fastener 302a. The fastener 302a may be embodied into a buckle type, a snap-fit hook structure, a Velcro® type, and/or the like. The fastener 302a may include a retractile section or material. According to the example shown in the present drawing, the fastener 302a is embodied into the buckle type.

Figure 4:
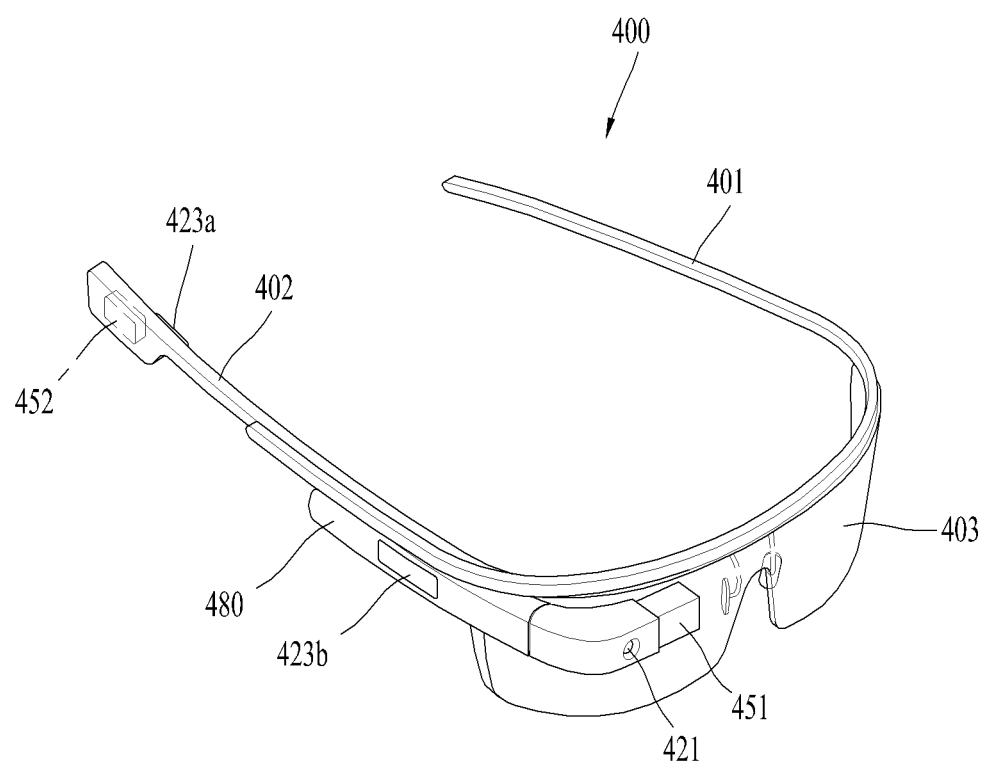
FIG. 4 is a perspective diagram for one example of a glass type mobile terminal 400 related to further embodiment of the present invention.

FIG. 4 is a perspective diagram for one example of a glass type mobile terminal 400 related to further embodiment of the present invention.

The glass type mobile terminal 400 is configured wearable on a head of a human body. To this end, the glass type mobile terminal 400 may include a frame unit (e.g., a case, a housing, etc.). The frame unit may be formed of a flexible material to be easily wearable. According to the example shown in the drawing, the frame unit of the mobile terminal 400 includes a $1^{st}$ frame 401 and a $2^{nd}$ frame 402, each of which can be made of a different material. In general, the mobile terminal 400 may have the same or similar features of the former mobile terminal 100 shown in FIGS. 1A to 1C.

The frame unit may be supported by the head and provides a space for mounting various components therein. As illustrated, electronic components such as a control module 480, an audio output unit 452 and the like may be installed in the frame unit. And, a lens 403 configured to cover at least one of the left and the right eye may be detachably installed in the frame unit.

The control module 480 is configured to control various electronic components provided to the mobile terminal 400. It may be appreciated that the control module 480 has the configuration corresponding to the aforementioned controller 180. According to the example shown in the present drawing, the control module 480 is installed in the frame unit on one side of the head, by which a location of the control module 480 is non-limited.

The display unit 451 may be embodied into a head mounted display (HMD). The HMD refers to a display system for directly projecting an image in front of user's eyes in a manner of being mounted on the head. In order to provide an image directly in front of the user's eyes, when the user wears the glass type mobile terminal 400, the display unit 451 may be disposed to correspond to at least one of the left eye and the right eye. According to the example shown in the present drawing, the display unit 451 is situated at a location corresponding to the right eye in order to output an image toward the user's right eye.

The display unit 451 may project an image into the user's eye using a prism. And, the prism may be formed to be optically transparent so that the user can watch the projected image and a general visual field (i.e., a range viewed by a user through the corresponding eye) in front of the user.

Thus, the image outputted through the display unit 451 may be viewed in a manner of overlapping the general visual field. The mobile terminal 400 can provide AR (Augmented Reality) by overlaying a virtual image on a real image or a background using the property of the display.

The camera 421 may be disposed adjacent to at least one of the left eye and the right eye to photograph an image in front. Since the camera 421 is situated adjacent to the eye, the camera 421 can obtain an image of a scene currently viewed by the user.

According to the example shown in the preset drawing, the camera 421 is provided to the control module 480, by which the present invention is non-limited. Alternatively, the camera 421 may be installed in the frame unit. Alternatively, a plurality of cameras may be provided to obtain stereoscopic images.

The glass type mobile terminal 400 may include user input units 423a and 423b manipulated to receive an input of a control command. The user input units 423a and 423b may employ any manners (e.g., touch, push, etc.) corresponding to a tactile manner in which a user can perform manipulations by experiencing a tactile sense. According to the example shown in the present drawing, the user input units 423a and 423b of the push input manner and the touch input manner are provided to the frame unit and the control module 480, respectively.

Moreover, the mobile terminal 400 may further include a microphone (not shown in the drawing) for receiving an input of a sound and then processing the input sound into electric audio data and an audio output module 452 for outputting audio. The audio output module 452 may be configured to transfer audio in a general audio output manner or an osteoconductive manner. In case that the audio output unit 452 is embodied in the osteoconductive manner, when the user wears the mobile terminal 400, the audio output unit 452 comes in close contact with a user's head and vibrates user's skull to transfer audio.

A communication system that can be embodied through the mobile terminal 100 according to the present invention is described in detail as follows.

First of all, a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

For clarity, the following description is limited to CDMA only. Yet, it is apparent that the present invention applies equally to other system types including not only CDMA wireless communication system but also OFDM (Orthogonal Frequency Division Multiplexing) wireless communication system.

The CDMA wireless communication system generally includes at least one terminal 100, at least one base station (BS) (possibly named Node B or Evolved Node B), at least one or more base station controllers (BSCs), and a mobile switching center (MSC). The MSC is configured to be connected to a conventional Public Switched Telephone Network (PSTN) and the BSCs. The BSCs are coupled to the base stations to pair with via backhaul line. The backhaul line may be provided in accordance with at least one of E1/T1, ATM, IP, PPP, Frame Relay, HDSL, ADSL, and xDSL. Hence, a plurality of BSCs can be included in the CDMA wireless communication system.

Each of a plurality of BSs (base stations) may include at least one or more sectors. And, each of the sectors may include an omni-directional antenna or an antenna indicating a specific direction radially away from the BS. Alternatively, each of the sectors may include two or more antennas of various types. Each of the BSs may be configured to support a plurality of frequency assignments. And, each of a plurality of the frequency assignments may have a specific spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In this case, the term "base station" may be used to refer collectively to one BSC and at least one BS. The base stations may indicate "cell site." Moreover, each of a plurality of sectors for a specific BS may be referred to as a plurality of cell sites.

A broadcasting transmitter (BT) transmits a broadcast signal to the mobile terminals 100 operating within the system. The broadcast receiving module 111 shown in FIG. 1A is typically configured inside the mobile terminal 100 to receive broadcast signals transmitted by the BT.

Moreover, Global Positioning System (GPS) for locating the position of the mobile terminal 100 may cooperate with the CDMA wireless communication system. The satellite 300 helps to obtain a location of the mobile terminal 100. Useful position information may be obtained with greater or fewer satellites than two. In doing so, it is able to trace a location of the mobile terminal 100 using all technologies capable of tracing locations or positions as well as the GPS tracking technology. If desired, at least one of the GPS satellites may be in charge of satellite DMB transmissions optionally or additionally.

The location information module 115 provided to the mobile terminal is generally configured to detect, calculate, or otherwise identify a position or location of the mobile terminal. As a representative example, the location information module 115 may include a Global Position System (GPS) module, a Wi-Fi (wireless fidelity) module, or both. If desired, the location information module 115 may alternatively or additionally function as any of the other modules of the wireless communication unit 110 to obtain data related to the position or location of the mobile terminal.

The GPS module 115 accurately calculates a current 3D location information according to latitude, longitude and latitude by measuring an accurate time and distance from three or more satellites and then applying trigonometry to the calculated informations. Currently, a method of acquiring distance and time information from three satellites and performing error correction with a single satellite is popularly used. Moreover, the GPS module 115 can acquire speed information by continuing to calculate a real-time current location. Yet, accuracy of a measured location or position of the mobile terminal may be compromised when the mobile terminal is located in such a blind spot of satellite signals as an indoor space or the like. In order to compensate the measured location by GPS system, it is able to use Wi-Fi Positioning System (WPS) and the like.

The Wi-Fi positioning system (WPS) is the location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal 100, a wireless access point (AP) connected to the mobile terminal 100, and a database storing random wireless AP information.

The mobile terminal 100 currently connected to the wireless AP may send a location information request message to the Wi-Fi location determination server.

The Wi-Fi location determination server extracts the information of the wireless AP connected to the mobile terminal 100, based on the location information request message (or signal) of the mobile terminal 100. The information of the wireless AP connected to the mobile terminal 100 may be sent to the Wi-Fi location determination server through the mobile terminal 100, or sent to the Wi-Fi location determination server from the wireless AP.

The information of the wireless AP extracted based on the location information request message of the mobile terminal 100 may include at least one of media access control (MAC) address, service set identification (SSID), received signal strength indicator (RSSI), reference signal received Power (RSRP), reference signal received quality (RSRQ), channel information, privacy, network type, signal strength, noise strength, and the like.

As mentioned in the above description, the Wi-Fi location determination server receives the information of the wireless AP connected to the mobile terminal 100 and may be then able to extract wireless AP information corresponding to the wireless AP connected to the mobile terminal from the pre-established database. In this case, the information of any wireless APs stored in the database may include information such as MAC address, SSID, RSSI, channel information, privacy, network type, latitude and longitude coordinate, building at which the wireless AP is located, floor number, detailed indoor location information (GPS coordinates available), AP owner's address, phone number, and the like. In doing so, in order to remove a mobile AP or a wireless AP provided using an illegal MAC address in the course of a location determining process, the Wi-Fi location determination server may extract only a prescribed number of wireless AP informations in order of high RSSI.

Thereafter, the Wi-Fi location determination server may extract (analyze) location information of the mobile terminal 100 using at least one wireless AP information extracted from the database. By comparing the included information and the received wireless AP information to each other, the location information of the mobile terminal 100 is extracted (or analyzed).

As a method for extracting (or analyzing) the location information of the mobile terminal 100, it is able to utilize a Cell-ID scheme, a fingerprint scheme, a trigonometry scheme, a landmark scheme and the like.

The Cell-ID scheme is used to determine a location of a wireless AP having the largest signal strength among peripheral wireless AP informations collected by a mobile terminal as a location of the mobile terminal. The Cell-ID scheme has advantages as follows. First of app, Implementation of the Cell-ID scheme is minimally complicated. Secondly, the Cell-ID scheme does not require additional costs. Thirdly, location information can be rapidly acquired. Yet, the Cell-ID scheme has the disadvantage in that the precision of positioning may fall below a desired threshold when the installation density of wireless APs is low.

The fingerprint scheme is a method of estimating a location through a signal strength information transmitted by a mobile terminal based on information collected by selecting a reference location from a service area. In order to use the fingerprint scheme, it is necessary to establish database of propagation characteristics in advance.

The trigonometry scheme is used to calculate a location of a mobile terminal based on a distance between coordinates of at least three wireless APs and the mobile terminal. In order to measure the distances between the mobile terminal and the wireless APs, signal strength may be converted into distance information, or Time of Arrival (ToA), Time Difference of Arrival (TDoA), Angle of Arrival (AoA) and the like may be used.

The landmark scheme is used to measure a location or position of a mobile terminal using a known landmark transmitter.

In addition to the above-listed schemes, various algorithms may be used to extract (or analyze) location information of a mobile terminal.

Such extracted location information may be transmitted to the mobile terminal 100 through the Wi-Fi location determination server, whereby the mobile terminal can acquire the location information.

The mobile terminal 100 can acquire location information by being connected to at least one wireless AP. In doing so, the number of wireless APs required for acquiring the location information of the mobile terminal 100 may be variously changeable depending on a wireless communication environment in which the mobile terminal 100 is situated.

As mentioned in the foregoing description with reference to FIG. 1A, short-range communication techniques such as Bluetooth™, Radio Frequency Identification (RFID), Infrared Data Association (IrDA), Ultra Wideband (UWB), Zig-Bee, Near Field Communication (NFC), Wireless USB (Wireless Universal Serial Bus) and the like may apply to the mobile terminal according to the present invention.

Among the short-range communication technologies, NFC module provided to the mobile terminal supports an inter-terminal non-contact type short-range wireless communication in a distance of about 10 cm range. The NFC module may operate in one of a card mode, a reader mode and a P2P mode. The mobile terminal 100 may further include a security module for storing card information in order to for the NFC module in the card mode. In this case, the security module may include one of a physical medium such as Universal Integrated Circuit Card (UICC) (e.g., Subscriber Identification Module (SIM), Universal SIM (USIM), etc.), Secure micro SD, a sticker and the like, or a logical medium (e.g., embedded Secure Element (SE), etc.) embedded in the mobile terminal. Data exchange may be performed between the NFC module and the security module based on Single Wire Protocol (SWP).

In a case that the NFC module operates in the card mode, the mobile terminal may externally transfer card information saved like a traditional IC card. In particular, if a mobile terminal storing card information of a payment card (e.g., a credit card, a bus card, etc.) approaches a card reader, a short-range mobile payment may be processed. If a mobile terminal storing card information of an entrance card approaches an entrance card reader, an entrance approval procedure may start. A card such as a credit card, a traffic card, or an entrance card may be loaded on the security module in the form of applet, and the security module may store card information on the loaded card. In this case, the card information of the payment card may include at least one of a card number, a remaining amount, a use history, and the like. The card information of the entrance card may include at least one of a user's name, a user's number (e.g., a user's student number, a user's staff number, etc.), an entrance history, and the like.

In case that the NFC module operates in the reader mode, the mobile terminal can read data from an external tag. In doing so, the data received from the external tag by the mobile terminal may be coded in NFC Data Exchange Format defined by NFC Forum. And, the NFC Forum generally defines four record types. In particular, the NFC Forum defines four Record Type Definitions (RTDs) such as Smart Poster, Text, Uniform Resource Identifier (URI), General Control and the like. If the data received from the external tag is a smart poster type, the controller can run a browser (e.g., Internet browser, etc.). If the data received from the external tag is a text type, the controller can run a text viewer. If the data received from the external tag is a URI type, the controller can run a browser or make a phone call. If the data received from the external tag is a general control type, the controller can execute an accurate operation in accordance with control contents.

In case that the NFC module operates in the P2P (Peer-to-Peer) mode, the mobile terminal can perform P2P communication with another mobile terminal. In this case, Logical Link Control Protocol (LLCP) can apply to the P2P communication. For the P2P communication, connection may be created between one mobile terminal and another mobile terminal. In this case, the connection may be categorized into a connectionless mode terminated after switching a single packet or a connection-oriented mode for exchanging packets consecutively. Through the P2P communication, data such as an electronic type business card, a contact information, a digital photo, a URL and the like, setup parameters for Bluetooth connection, Wi-Fi connection, etc. can be exchanged. Yet, the P2P mode can be effectively utilized in exchanging data in small size because an available distance for the NFC communication is relatively short.

Embodiments related to a controlling method implemented in the above-configured mobile terminal shall be described in more detail with reference to the accompanying drawings. It is understood by those skilled in the art that the present features can be embodied in several forms without departing from the characteristics thereof.

In the following description, embodiments of the present specification shall be described by taking the mobile terminal 100 shown in FIG. 1A as one example. Yet, it is a matter of course that a mobile terminal according to one embodiment of the present invention can be embodied with the mobile terminals 200, 300 and 400 shown in FIGS. 2 to 4.

In the following description, embodiments of the present invention shall be described with reference to FIGS. 5 to 18. In describing and understanding the embodiments of the present invention, the contents described with reference to FIGS. 1 to 4 can be referred to. And, the aforementioned mobile terminal may include a mobile terminal according to one embodiment of the present invention.

Figure 5:
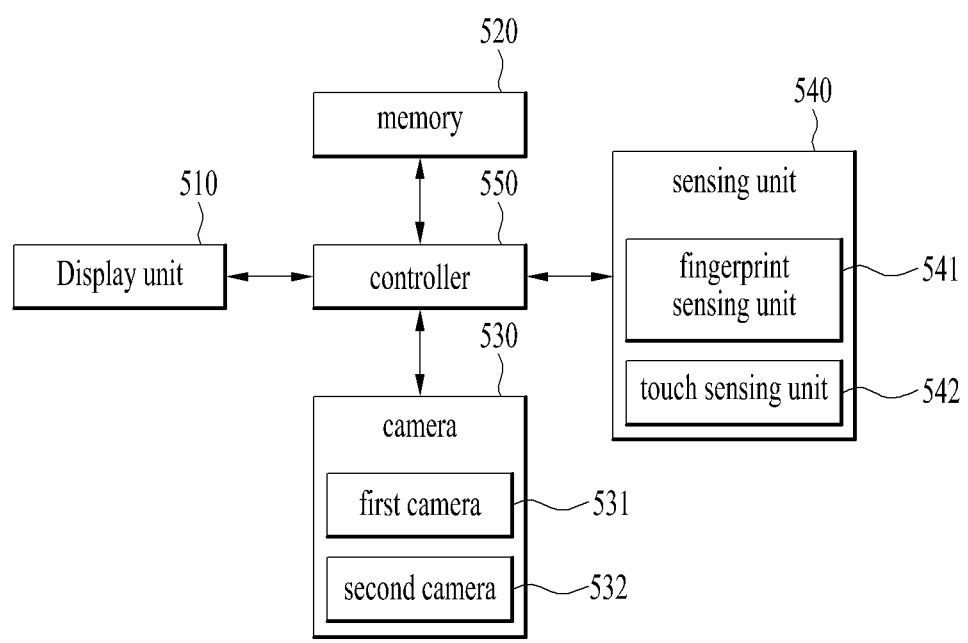
FIG. 5 is a block diagram to describe a configuration module of a mobile terminal according to one embodiment of the present invention.

FIG. 5 is a block diagram to describe a configuration module of a mobile terminal according to one embodiment of the present invention.

Referring to FIG. 5, a mobile terminal according to the present invention may include a display unit 510, a memory 520, a camera 530, a sensing unit 540, a controller 550 and the like. Moreover, the display unit 510, the memory 520, the camera 530, the sensing unit 540 and the controller 550 can be implemented with the description with reference to FIG. 1A.

The display unit 510 may output visual information. Here, the visual information may include a content, an application, an image, a video, etc. Moreover, the display unit 510 may output visual information to a screen based on a control command of the controller 550. Moreover, according to one embodiment of the present invention, the display unit 510 may output a video content, a content including at least one menu for editing a video, and at least one thumbnail corresponding to a video.

The memory 520 may store data supportive of various functions of the mobile terminal. The memory 520 may store programs for processing and control of the controller 550 and perform a function for temporary storage of input/output data. Meanwhile, the memory 520 may be located inside or outside the mobile terminal, Moreover, according to one embodiment of the present invention, the memory 520 may store video contents.

The camera 530 may process picture frames of a still image or moving images obtained by an image sensor. Moreover, according to one embodiment of the present invention, the camera 530 may include a first camera 531 and a second camera 532. The first camera 531 may sense user's eyes and the second camera 532 may shoot a video.

Here, the first camera 531 and the second camera 532 may correspond to the same camera. For example, a camera provided to a front side of the mobile terminal may play roles of the first and second cameras 531 and 532. Moreover, the first camera 531 and the second camera 532 may correspond to different cameras, respectively. For example, the first camera 531 may correspond to a camera provided to the front side of the mobile terminal and the second camera 532 may correspond to a camera provided to a rear side of the mobile terminal.

The sensing unit 540 may sense user's various inputs and an environment of the mobile terminal and then forward a sensing result to enable the controller 550 to perform an operation according to the sensing result. According to one embodiment of the present invention, the sensing unit 540 may include a fingerprint sensing unit 541 and a touch sensing unit 542. The fingerprint sensing unit 541 is disposed on at least one of the front side and the rear side of the mobile terminal, thereby sensing a fingerprint input. The touch sensing unit 542 is disposed on the front side of the mobile terminal, thereby sensing various touch inputs, various gesture inputs, etc. Moreover, the fingerprint sensing unit 541 and the touch sensing unit 542 may include a pressure sensor. Yet, in the following description, the fingerprint sensing unit 541 and the touch sensing unit 542 shall be described as the sensing unit 540 senses fingerprint and touch inputs without discriminating the fingerprint sensing unit 541 and the touch sensing unit 542 from each other.

The controller 550 may process data, control the aforementioned units of the mobile terminal, and control data transmission/reception between the units. Moreover, according to one embodiment of the present invention, if an extracted fingerprint information matches a registered fingerprint information, the controller 50 can set up a security section of a video content.

Moreover, according to one embodiment of the present invention, operations performed by the mobile terminal can be controlled by the controller 550. For clarity of the following description, such operations shall be generically described as performed/controlled by the mobile terminal.

FIG. 6 is a diagram for one example of a mobile terminal related to the present invention.

Particularly, FIG. 6(a) is a front-view perspective diagram of a mobile terminal related to the present invention, and FIG. 6(b) is a rear-view perspective diagram of a mobile terminal related to the present invention.

The display unit 610 may be disposed on a front side of the mobile terminal and display visual information. Moreover, the display unit 610 may be integrated with a touch sensing unit to form a touchscreen. In this case, the touchscreen may become a user input unit. And, the touch screen may sense user's fingerprint by being provided with a fingerprint sensing unit. According to one embodiment of the present invention, the mobile terminal may separately include a front fingerprint sensing unit 620. Namely, as the fingerprint sensing unit is provided onto the touchscreen of the display unit 610, the mobile terminal can sense a user's fingerprint. And, the mobile terminal can sense a user's fingerprint through the front fingerprint sensing unit 620 as well. According to one embodiment of the present invention, the display unit 610 may sense a user's fingerprint or touch input for user authentication. Moreover, according to one embodiment of the present invention, the display unit 610 may provide a visual feedback to a user.

A front camera module 630 may photograph a user's face in case of a video call, a selfie, or the like. Moreover, a rear camera module 640 may photograph a subject within a view angle area.

A rear input unit 650 may be disposed under the rear camera module 640 and receive a command for controlling an operation of the mobile terminal. The rear input unit 650 may receive commands for power-on/off, start, end, scroll and the like and commands for volume adjustment of an audio outputted from an audio output unit (not shown), switching to a touch recognition mode of a display unit, and the like. Moreover, the rear input unit 650 may be provided with a fingerprint sensing unit, thereby sensing a user's fingerprint.

Meanwhile, an audio output unit (not shown) may be additionally disposed on a rear side of a mobile terminal. In the present invention, the audio output unit (not shown) can provide sound feedbacks to a user. In the present invention, the mobile terminal is assumed as implemented with the embodiment shown in FIG. 6.

Figure 7:
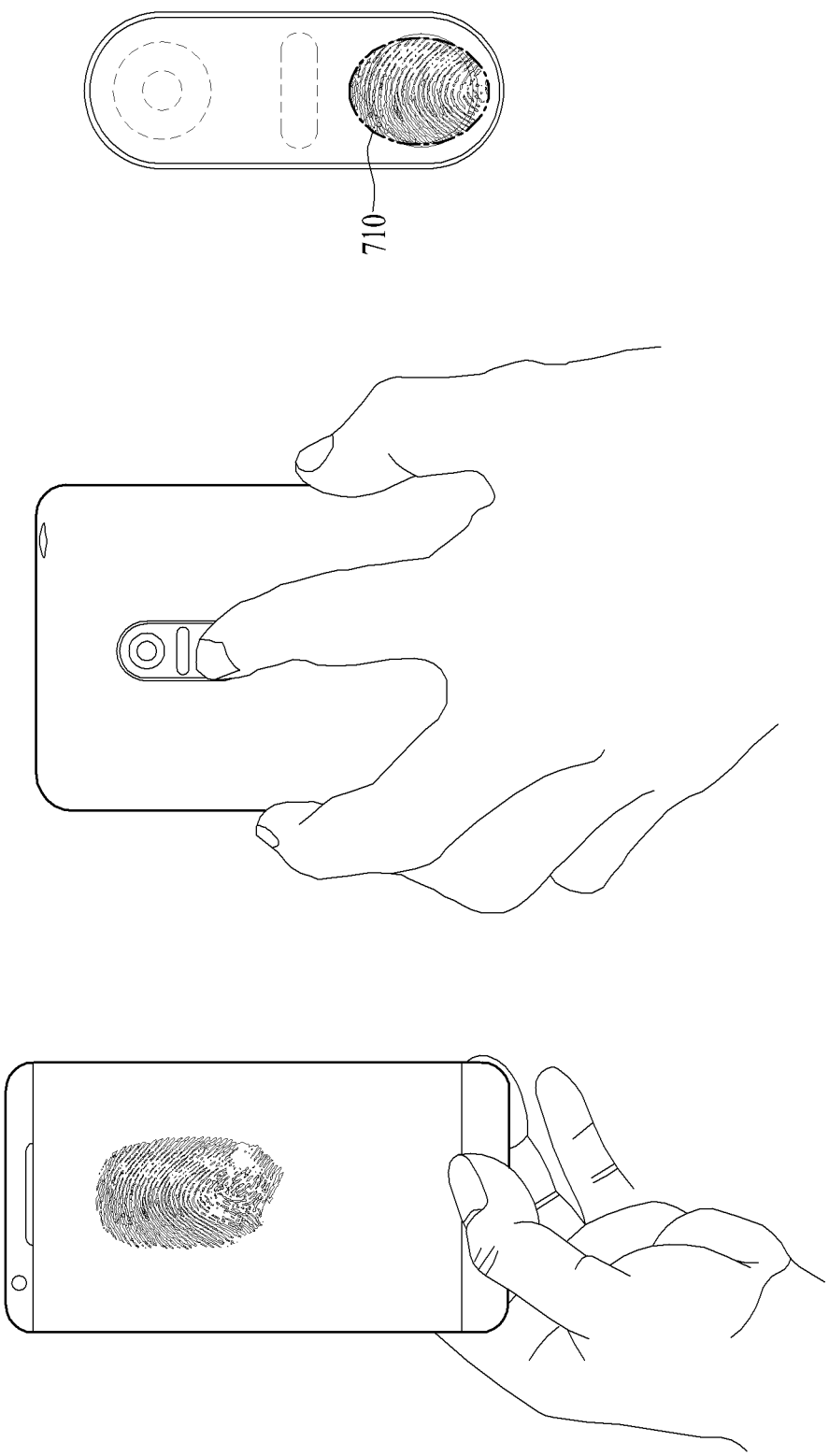
FIG. 7 is a diagram to describe a method of recognizing a fingerprint in a mobile terminal according to one embodiment of the present invention.

FIG. 7 is a diagram to describe a method of recognizing a fingerprint in a mobile terminal according to one embodiment of the present invention.

A fingerprint represents ridgelines indicating that sweat gland rises higher than surroundings. Namely, a fingerprint pattern indicates a pattern of ridgelines indicating that sweat gland rises higher than surroundings.

First of all, as shown in a first diagram of FIG. 7, a mobile terminal may sense a user's fingerprint input to a front input unit. And, as shown in a second diagram of FIG. 7, the mobile terminal may sense a user's fingerprint input to a rear input unit. Moreover, as shown in a third diagram of FIG. 7, the mobile terminal can sense a user's fingerprint input 710. In doing so, the mobile terminal can recognize a pattern of the user's fingerprint. Through this, the mobile terminal can make data of fingerprint information including a fingerprint pattern per finger and then store the data.

Meanwhile, a fingerprint sensing unit provided to a mobile terminal can sense a fingerprint in various ways. For example, a mobile terminal can include an optical fingerprint sensing unit obtaining light refraction information of a sweat touched point. For another example, a mobile terminal can include a ultrasonic fingerprint sensing unit obtaining sweat gland location information of the dermal layer using ultrasonic waves. For another example, a mobile terminal may include a capacitance fingerprint sensing unit that uses an electric charge difference between a sweat touched point and a skin epidermis. For another example, a mobile terminal may include a fingerprint sensing unit that uses component analysis information of discharged sweat by being combined with a biosensor.

In the following embodiments shown in FIGS. 8 to 18, a method of setting up a security section of a video content using a fingerprint sensed through a fingerprint sensing unit is described. And, a method of recognizing a user's fingerprint using a fingerprint sensing unit provided to a front side of a mobile terminal is taken as an example in the following description. Yet, it is a matter of course that the mobile terminal can recognize a user's fingerprint through a touchscreen provided to a display unit or a fingerprint sensing unit provided to a rear side of the mobile terminal.

Embodiment of Setting a Security Section when Shooting a Video Content

When a user shoots a video content using a mobile terminal, if inputting a registered fingerprint information, the user can set up a security section of the video content. Regarding this, one example of setting up a security section when shooting a video content is described with reference to FIG. 8 and FIG. 9 as follows.

FIG. 8 is a diagram to describe an example of setting up a security section when shooting a video content according to one embodiment of the present invention. In the following, description redundant with FIGS. 5 to 7 shall be omitted from the embodiment shown in FIG. 8.

Referring to a first diagram of FIG. 8(*a*), a mobile terminal can display a real-time image sensed through a camera on a display unit. Moreover, while the real-time image is outputted, the mobile terminal may sense a first input 810 for shooting a video. Here, the first input signal 810 may include a touch input signal using a finger of a user of the mobile terminal for a video shot icon. Hence, the mobile terminal can start a video shooting.

Meanwhile, referring to a second diagram of FIG. 8(*a*), the mobile terminal may sense a second input signal 820 in the course of the video shooting. Here, the second input signal 820 may correspond to an input signal for a fingerprint sensing unit provide to a front side of the mobile terminal. Moreover, it is a matter of course that the second input signal 820 may correspond to an input signal for a fingerprint sensing unit provided to a rear side of the mobile terminal, which is not shown in FIG. 8. The mobile terminal can extract fingerprint information from the second input signal 820. In this case, the mobile terminal may determine whether the extracted fingerprint information corresponds to registered fingerprint information. Here, there may exist a plurality of the registered fingerprint informations. Hence, if the extract fingerprint information matches one of a plurality of the registered fingerprint informations, the mobile terminal can determine that the extracted fingerprint information corresponds to the registered fingerprint information.

Referring to a third diagram of FIG. 8(*a*), if the extracted fingerprint information corresponds to the registered fingerprint information, a security section of a video content can be set up. Here, the security section may correspond to a section encrypted in a video based on a time for which the sensing of the second input signal 820 is maintained. Regarding this, referring to FIG. 8(*b*), a timing t1 may correspond to a security section start point according to the second input signal 820. Namely, the security section may correspond to a section of at least one portion of the video content. According to one embodiment of the present invention, the security section set-up video content can be open to a user of the mobile terminal only if a registered fingerprint is inputted. This shall be described in detail with reference to FIGS. 11 to 16 later. If the security section of the video content is set up, while the security section is maintained, the mobile terminal can output a security indicator 830 to the video content. Here, the security indicator 830 may be outputted in a manner of overlapping the video content outputted to the display unit. By confirming that the security indicator 830 is outputted, the user can recognize that a prescribed section of the currently shot video content is set as the security section.

Moreover, regarding a length or time of the security section in the video content, referring to FIG. 8(*b*), a total shooting time of the video content may correspond to d1 and a time set for the security section may correspond to d2. Here, t1 may correspond to a time at which the mobile terminal starts to sense the second input signal 820. And, t2 may correspond to a time at which the mobile terminal ends the sensing of the second input signal 820. Hence, the mobile terminal can set up the security section of the video content, which ranges from a start time of sensing the second input signal 820 to an end time of sensing the second input signal 820. Namely, 'd2' set as the security section may correspond to a time from t1 to t2. Moreover, 'd2' set as the security section may be equal to or shorter than 'd1' corresponding to a total shooting time of the video content.

Figure 9:
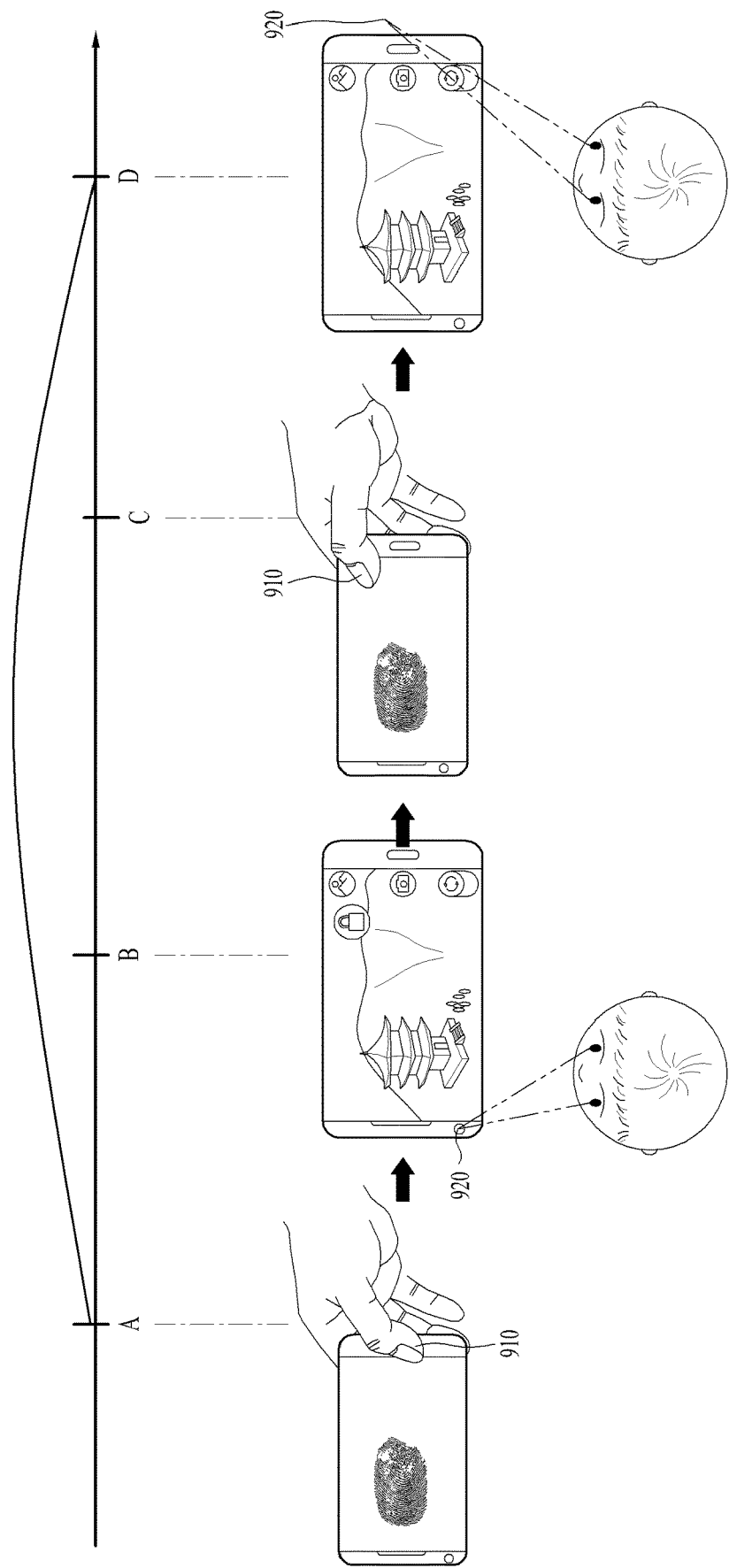
FIG. 9 is a diagram to describe an example of setting up a security section when shooting a video content according to another embodiment of the present invention.

FIG. 9 is a diagram to describe an example of setting up a security section when shooting a video content according to another embodiment of the present invention. Particularly, FIG. 9 shows a method of setting up a security section by user's eyes as well as by fingerprint information. In the following, description redundant with FIGS. 5 to 7 shall be omitted from the embodiment shown in FIG. 9.

Point A in FIG. 9 may correspond to a security section start point in the embodiment shown in FIG. 8. Namely, a mobile terminal can sense a first input signal 910 for setting up a security section of a currently shot video. According to the embodiment of FIG. 8, the first input signal 910 may correspond to an input signal for a fingerprint sensing unit provided to a front side of the mobile terminal. Hence, if a fingerprint information extracted from the first input signal 910 corresponds to a registered fingerprint information, the mobile terminal can set up a security section for a currently shot video. Here, the first input signal may correspond to a preset touch input signal unlike FIG. 8. And, the preset touch input signal may include a long touch, a deep press touch, or the like. The long touch may correspond to a touch input signal over a preset time. And, the deep press touch may correspond to a touch input signal in which at least one of an area or pressure sensed from a touch input corresponds to a preset range Meanwhile, the mobile terminal can sense user's eyes information through a camera provided to the front side in the course of the video shooting. Point B shown in FIG. 9 may correspond to a point at which the mobile terminal senses a second input signal 920. Namely, if the first input signal 910 corresponds to a preset touch input signal, the second input signal 920 can be sensed unlike FIG. 8. Here, the second input signal 920 may correspond to a signal generated based on user's eyes sensed by a front camera. For example, a user may apply an input of a deep press touch to the fingerprint sensing unit provided to the front side of the mobile terminal and then stare at the camera provided to the front side of the mobile terminal. Moreover, the camera senses the user's eyes only, but the sensing of the second input signal 920 is not maintained only if staring at the camera. Namely, if user's eyes are located in a preset region, the mobile terminal can determine that it is the second in put signal 920. For example, the user can stare at a video content on a display unit and the mobile terminal can sense the eyes of the user staring at the display unit as the second input signal 920.

In doing so, while the second input signal 920 is sensed, the mobile terminal can maintain the security section setup of the video content. Moreover, while the security section of the video content is maintained, it is a matter of course that a security indicator can be outputted.

Moreover, Point C in FIG. 9 may correspond to a point at which the mobile terminal does not sense the first input signal 910 anymore. According to one embodiment of the present invention, while the second input signal 920 is sensed, the mobile terminal can continue to set up the security section of the video content despite that the first input signal 910 is not maintained. For example, a user applies an input of a deep press touch, as the first input signal 910, to the fingerprint sensing unit provided to the front side of the mobile terminal and stares at the camera provided to the front side of the mobile terminal. In doing so, although the user does not touch the fingerprint sensing unit anymore, while the user stares at the camera, the mobile terminal can maintain the security section setup of the video content. Moreover, while the second input signal 920 is sensed, as the security section of the video content is maintained, the mobile terminal can output a security indicator.

Point D in FIG. 9 may correspond to a point at which the security section ends. Namely, the point D in FIG. 9 may correspond to a point at which the mobile terminal does not sense the second input signal 920 anymore. In this case, the mobile terminal may determine that the user's eyes have deviated from the preset region. According to one embodiment of the present invention, if the second input signal 920 is not sensed anymore, the mobile terminal can end the security section setup of the video content. For example, if a user currently shooting a video content does not stare at the camera anymore, the mobile terminal can end the security section setup of the video content. Moreover, if the security section setup ends, the mobile terminal may not output the security indicator.

Through the above embodiment, although the user does not touch the fingerprint sensing unit with a finger, the user can maintain the security section setup of the video content by maintaining the user's eyes on the video content outputted to the display unit.

Embodiment of Setting Up a Security Section in Editing a Video Content

When a user edits a video content using a mobile terminal, if the user inputs a registered fingerprint information, the user can set up a section of the video content. Regarding this, when a video content is edited, one example of setting a security section is described with FIG. 10. Moreover, according to an embodiment in FIG. 10, a video content is assumed as a shooting-completed video.

Figure 10:
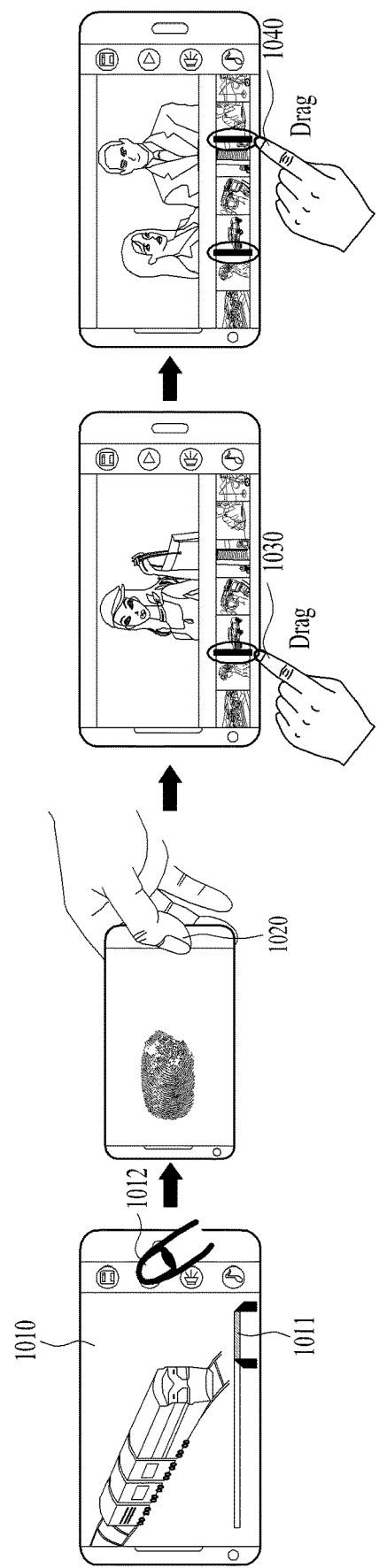
FIG. 10 is a diagram to describe an example of setting up a security section when editing a video content according to one embodiment of the present invention.

FIG. 10 is a diagram to describe an example of setting up a security section when editing a video content according to one embodiment of the present invention. In the following, description redundant with FIGS. 5 to 8 shall be omitted from the embodiment shown in FIG. 10.

Referring to a first diagram of FIG. 10, a mobile terminal can output a video editing content 1010 to a display unit. Here, the video editing content 1010 may correspond to a content including at least one menu for editing a video content. And, the video content may correspond to a video stored in a memory of the mobile terminal. Moreover, the at least one menu for editing the video content may include a timeline 1011. Here, the timeline 1011 is outputted onto the video content and may correspond to a menu indicating a playtime of the video content. While the video editing content 1010 is outputted, the mobile terminal can sense a first input signal 1012. Here, the first input signal 1012 may correspond to a signal of touching a play icon for the editing of the video content. Hence, the mobile terminal can play the video content.

Referring to a second diagram of FIG. 10, while the video content is played, the mobile terminal can sense a second input signal 1020. Here, the second input signal 1020 may be sensed by a fingerprint sensing unit provided to a front side of the mobile terminal. The mobile terminal can extract a fingerprint information from the second input signal 1020. If the extracted fingerprint information corresponds to a registered fingerprint, the mobile terminal can set up a security section of the video content. In the following, a method of setting up a security section using the timeline 1011 is described in detail unlike FIG. 8.

Referring to a third diagram of FIG. 10, the mobile terminal can sense a third input signal 1030 for the timeline 1011. Here, the third input signal 1030 may correspond to a touch input of dragging or flicking at least one portion of the outputted timeline 1011. Hence, the mobile terminal can set up a security section based on a location from which the third input signal 1030 is sensed. For example, if the user drag-touches at least one portion of the timeline 1011, at least one partial region of the dragged timeline 1011 can be set up as a security section.

Referring to a fourth diagram of FIG. 10, the mobile terminal can sense a fourth input signal 1040 for the timeline 1011. Here, like the third input signal 1030, the fourth input signal 1040 may correspond to a touch input of dragging or flicking at least one portion of the outputted timeline 1011. Namely, in response to a plurality of input signal for the timeline 1011, the mobile terminal can set up a section corresponding to an input signal sensed location as a security section. Therefore, a plurality of security sections can be set up in a single video content.

Through the above embodiment, a user can easily set up a security section through a fingerprint input and a touch input to a shooting-completed video.

Embodiment of Outputting a Thumbnail when Listing Video Contents

A user can check a thumbnail list indicating at least one video content stored in a memory using a mobile terminal. In doing so, if the user inputs a registered fingerprint information, the user can check a thumbnail of a video contents having a security section set up therefor. Regarding this, one example of outputting a thumbnail when listing video contents is described with reference to FIG. 11 and FIG. 12. Assume that a video content is assumed as a shooting-completed video in FIG. 11 and FIG. 12.

Figure 11:
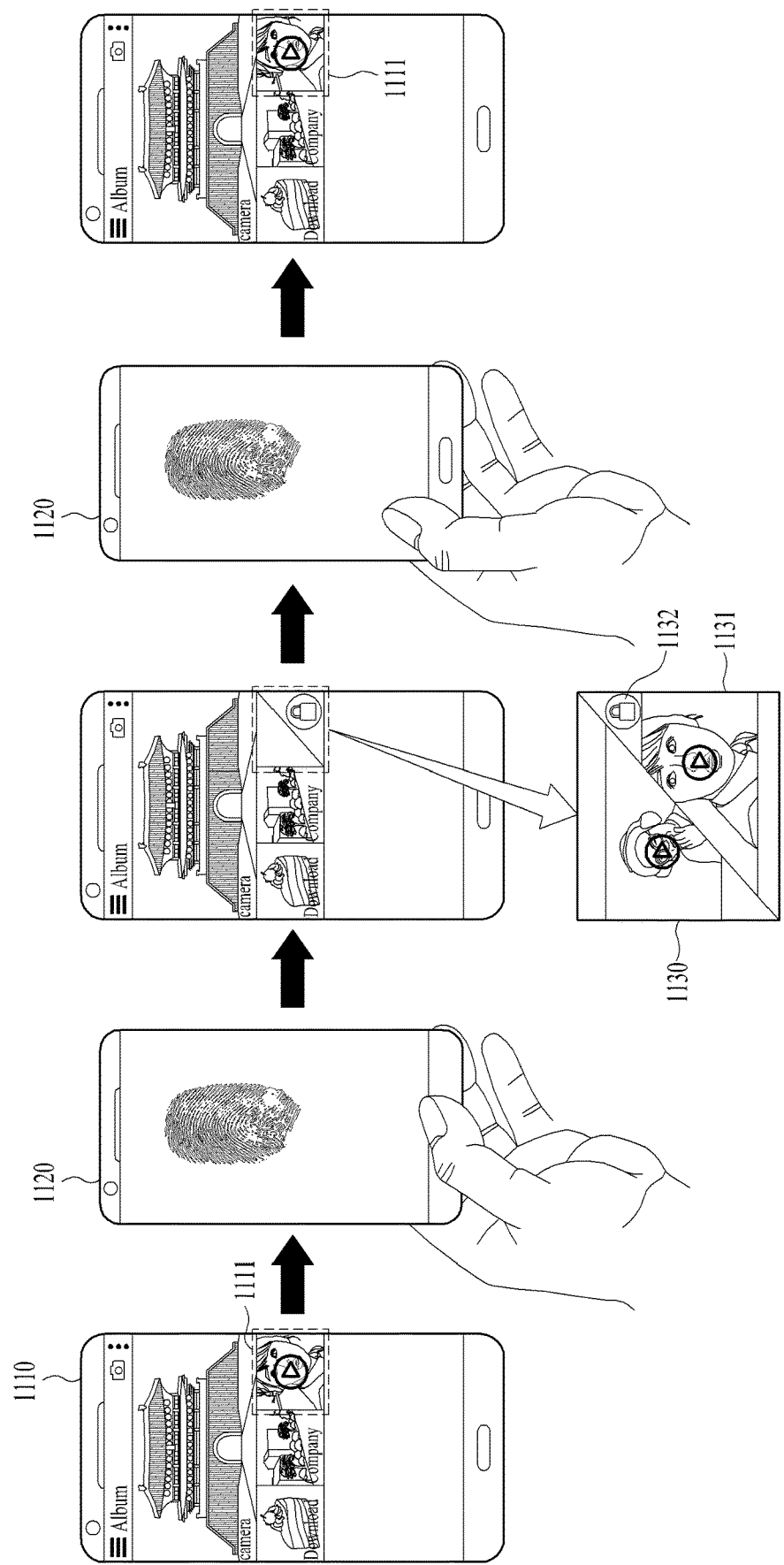
FIG. 11 is a diagram to describe an example of outputting a thumbnail of a video including a security section in response to an input signal when listing video contents according to one embodiment of the present invention.

FIG. 11 is a diagram to describe an example of outputting a thumbnail of a video including a security section in response to an input signal when listing video contents according to one embodiment of the present invention. In the following, description redundant with FIGS. 5 to 8 shall be omitted from the embodiment shown in FIG. 11.

Referring to a first diagram of FIG. 11, a mobile terminal can output at least one thumbnail 1110 corresponding to at least one video content. Here, at least one portion of a video content corresponding to a thumbnail may correspond to a video including a security section. The at least one thumbnail may correspond to a thumbnail indicating a section of the video content except the security section. In doing so, the mobile terminal can output a thumbnail 1111 indicating a section except a security section in a first video content. In the following description, the thumbnail 1111 corresponding to the first video content is taken as one example. Yet, it is a matter of course that the following embodiment is applicable to thumbnails corresponding to all video contents stored in a memory of the mobile terminal.

Referring to a second diagram of FIG. 11, while the thumbnail 1111 indicating the section except the security section in the first video content is outputted, the mobile terminal can sense a first input signal 1120. Here, the first input signal 1120 may correspond to an input signal for a fingerprint sensing unit provided to a front side of the mobile terminal. For example, the first input signal 110 may include one of a short touch, a long touch, a drag touch, a flick touch and the like. For example, the user may input the first input signal 1120 to the mobile terminal by drag-touching the fingerprint sensing unit.

As sensing the first input signal 1120, the mobile terminal may extract a fingerprint information from the first input signal and then determine whether the extracted fingerprint information corresponds to a registered fingerprint.

Referring to a third diagram of FIG. 11, if the extracted fingerprint information corresponds to the registered fingerprint information, the mobile terminal can output a thumbnail 1130 indicating the section except the security section of the first video content and a thumbnail 1131 indicating the security section of the first video content. In doing so, the mobile terminal can output a security indicator 1132 onto the thumbnail 1131 indicating the security section of the first video content. Thereafter, the mobile terminal can play the first video content except the security section or the first video content including the security section through a second input signal (not shown), which is not shown in the drawing. Here, the second input signal may correspond to a signal for selecting the thumbnail 1130 indicating the section except the security section of the first video content or the thumbnail 1131 indicating the security section of the first video content.

Namely, according to one embodiment, only if sensing a fingerprint input corresponding to a registered fingerprint information, the mobile terminal can output a thumbnail indicating a security section of a video content. Moreover, through the thumbnail having the security indicator 113 outputted thereto, a user can check the security section set-up video content. Hence, since a user failing to have the registered fingerprint information is unable to watch the thumbnail for the security section set-up video content, personal information of a mobile terminal user can be further protected.

Referring to a fourth diagram and a fifth diagram of FIG. 11, if the first input signal 1120 is not sensed anymore, the mobile terminal can output the thumbnail 1111 indicating the section except the security section of the first video content only like the first diagram of FIG. 11. Namely, only if the user is touching the fingerprint sensing unit, the mobile terminal can output the thumbnail 1130 indicating the section except the security section and the thumbnail 1131 indicating the security section. If the user detaches a finger from the fingerprint sensing unit, the mobile terminal can output the thumbnail 1111 indicating the section except the security section.

Figure 12:
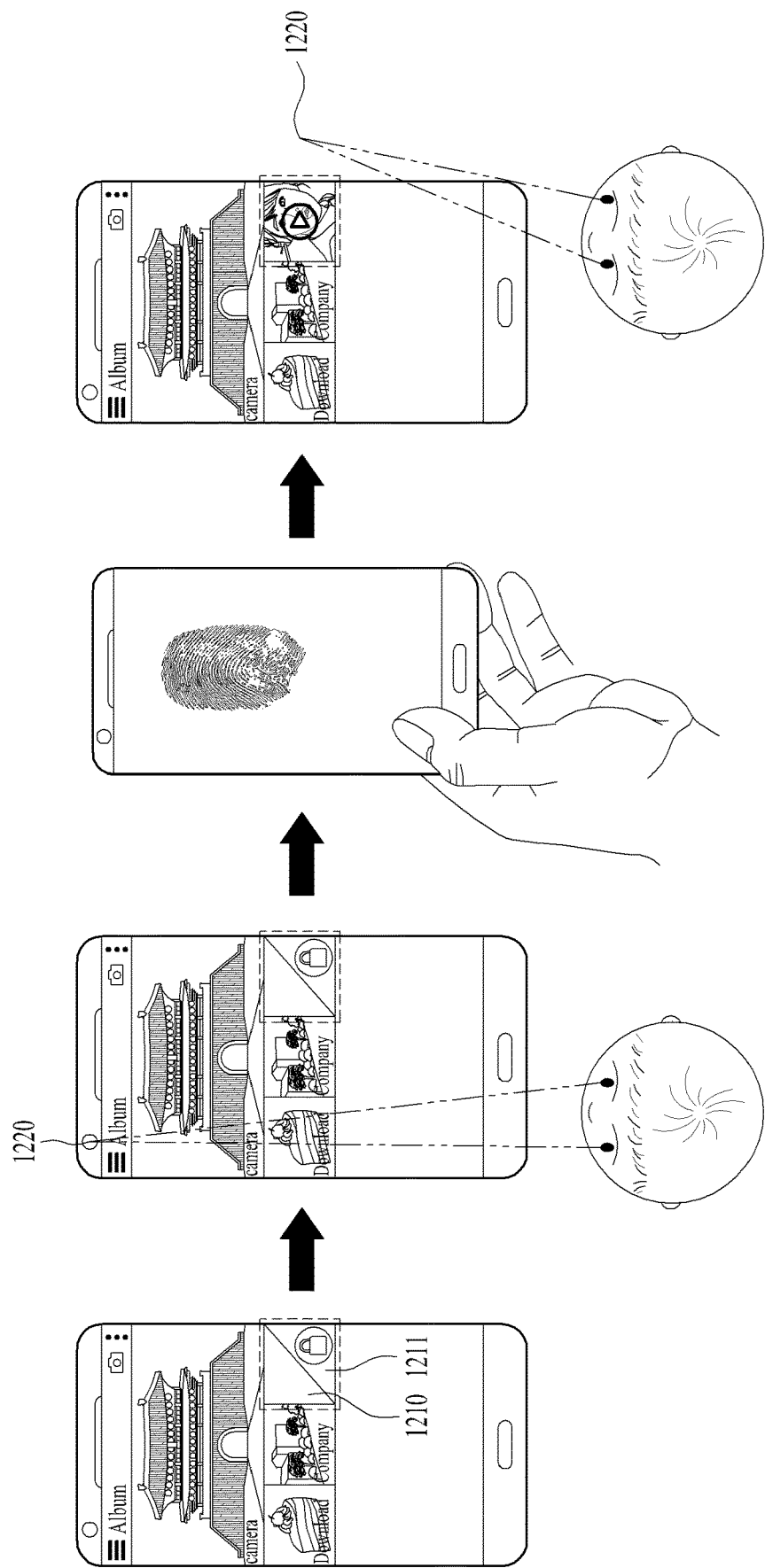
FIG. 12 is a diagram to describe an example of outputting a thumbnail of a video including a security section in response to an input signal when listing video contents according to another embodiment of the present invention.

FIG. 12 is a diagram to describe an example of outputting a thumbnail of a video including a security section in response to an input signal when listing video contents according to another embodiment of the present invention. In particular, FIG. 12 shows a method of when listing video contents, outputting a thumbnail of a video including a security section according to user's eyes as well as fingerprint information. In the following, description redundant with FIGS. 5 to 9 and FIG. 11 shall be omitted from the embodiment shown in FIG. 12. A first diagram of FIG. 12 corresponds to the third diagram of FIG. 11. Hence, the first diagram of FIG. 12 corresponds to a diagram after the mobile terminal has performed authentication in response to the first input signal according to the first and second diagrams of FIG. 11.

Referring to a first diagram of FIG. 12, the mobile terminal can output a thumbnail 1210 indicating a section except a security section of a first video content and a thumbnail 1211 indicating the security section of the first video content.

In doing so, referring to a second diagram of FIG. 12, if a first input signal corresponds to a preset touch input signal, the mobile terminal can sense a second input signal 1220. Here, the second input signal 1220 may correspond to a signal generated based on user's eyes sensed by a camera. Moreover, the second input signal 1220 may correspond to the same signal as the second input signal described in FIG. 9. According to one embodiment of the present invention, while the second input signal 1220 is sensed, the mobile terminal can output the thumbnail 1210 indicating the section except the security section of the first video content and the thumbnail 1211 indicating the security section of the first video content.

Referring to a third diagram of FIG. 12, although the first input signal is not sensed, while the second input signal 1220 is sensed, the mobile terminal can output the thumbnail 1210 indicating the section except the security section of the first video content and the thumbnail 1211 indicating the security section of the first video content. For example, when the user checks a thumbnail for a security section set-up video content, the user can apply an input of a deep press touch to a fingerprint sensing unit provided to a front side of the mobile terminal. In doing so, as the mobile terminal senses a preset touch input signal, it can sense an input of user's eyes. For example, the user can stare at a camera provided to the front side of the camera. Thereafter, although the user detaches a hand from the fingerprint sensing unit, while the mobile terminal senses the input of the user's eyes, the mobile terminal can output a thumbnail indicating a section except a security section and a thumbnail indicating the security section.

Referring to a fourth diagram of FIG. 12, if the second input signal 1120 is not sensed anymore, the mobile terminal can output the thumbnail indicating the section except the security section of the first video content like the first diagram of FIG. 11. For example, if the user does not stare at the camera provided to the front side of the mobile terminal anymore, the mobile terminal can output the thumbnail indicating the section except the security section of the first video content only.

Embodiment of Playing a Video Content Including a Security Section when Playing a Video Content A user can play a video content using a mobile terminal. In doing so, if the user inputs a registered fingerprint information, the video content can be played by including a security section. Regarding this, when a video content is played, one example of playing the video content including a security section shall be described with reference to FIGS. 13 to 15. Moreover, in the embodiments shown in FIGS. 13 to 15, a video content is assumed as a shooting-completed video including a security section.

Figure 13:
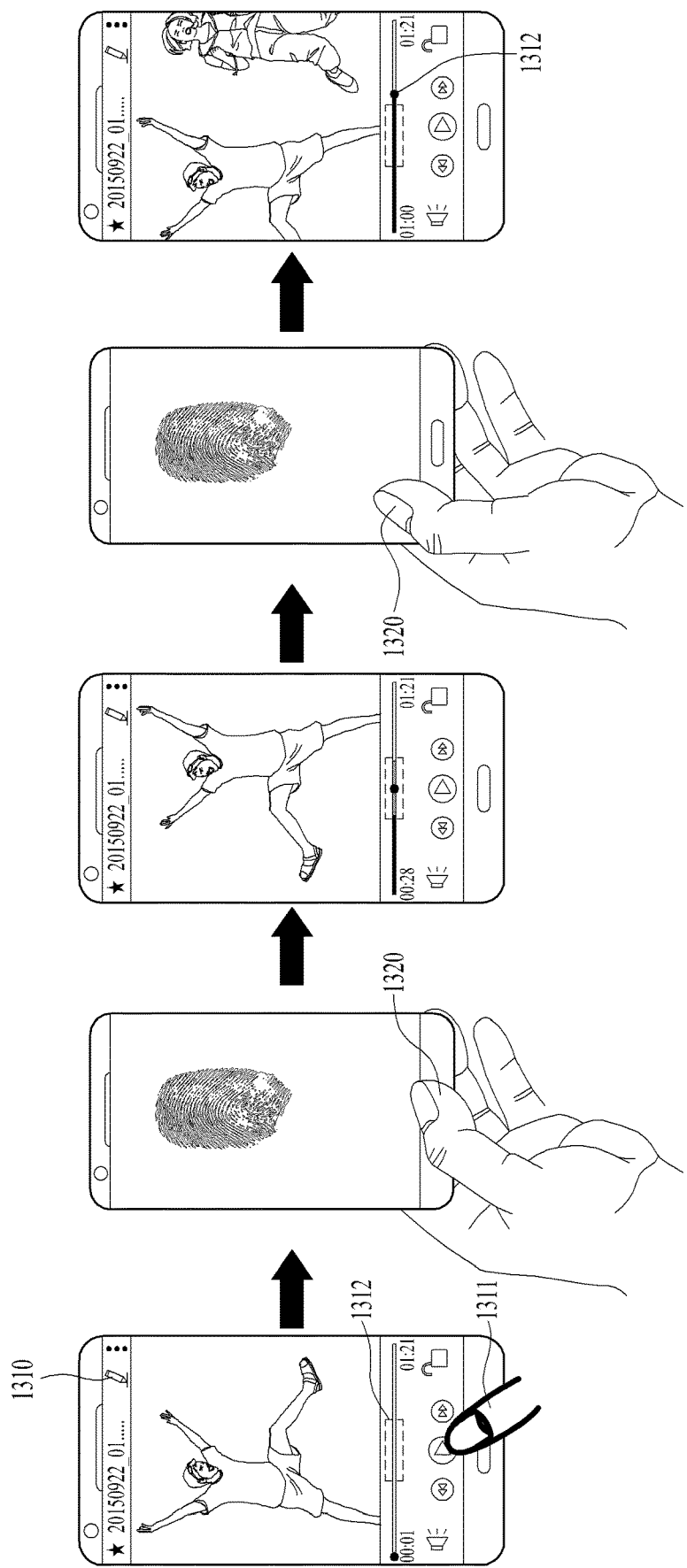
FIG. 13 is a diagram to describe an example of playing a video content including a security section in response to an input signal when playing a video content according to one embodiment of the present invention.

FIG. 13 is a diagram to describe an example of playing a video content including a security section in response to an input signal when playing a video content according to one embodiment of the present invention. In the following, description redundant with FIGS. 5 to 8 shall be omitted from the embodiment shown in FIG. 13.

First of all, a mobile terminal can sense a signal for selecting a single thumbnail from a list of a plurality of thumbnails corresponding to a video content [not shown in FIG. 13]. In this case, referring to a first diagram of FIG. 13, the mobile terminal can output a video content 1310. In this case, the video content 1310 may correspond to a state prior to playback. Here, the video content 1310 may correspond to a video content having a security section 1311 set up therein. Yet, before user authentication through fingerprint recognition is completed, the mobile terminal may not output the security section 1311. Moreover, while the video content 1310 is outputted, the mobile terminal may sense a first input signal 1311. Here, the first input signal 1311 may correspond to a signal for selecting a play icon of the video content 1310. As the mobile terminal senses the first input signal 13100, it can play the video content 1310.

Referring to a second diagram of FIG. 13, the mobile terminal can sense a second input signal 1320. Here, the second input signal 1320 may correspond to an input signal for a fingerprint sensing unit provided to a front side of the mobile terminal. The mobile terminal can extract a fingerprint information from the second input signal 1320. Thereafter, the mobile terminal can determine whether the extracted fingerprint information corresponds to a registered fingerprint information. Thereafter, if the extracted fingerprint information corresponds to the registered fingerprint information, the mobile terminal can output a security section 1311. As sensing the second input signal 1320, the mobile terminal can play the video content 1310 including the security section 1311. Besides, it is a matter of course that the mobile terminal may sense the second input signal 1330 and then sense the second input signal 1330.

A method of playing the video content 1310 including the security section 1311 in the mobile terminal is described as follows. The mobile terminal can naturally play the video content 1310 including the security section 1311. On the contrary, if the extracted fingerprint information does not correspond to the registered fingerprint information, the mobile terminal can play the video content 1310 in a manner of excluding the security section 1311. When the video content 1310 is played in a manner of excluding the security section 1311, the mobile terminal can play the video content with a visual effect in a manner that a start and end of the section having the security section 1311 set up therefor naturally fade in or out. Moreover, the mobile terminal may play the start and end of the section having the security section 1311 set up therefor with an effect as if an image is cut off. Moreover, it is a matter of course that the mobile terminal can play a start and end of the section having the security section 1311 set up therefor with various visual effects.

Referring to fourth and fifth diagrams of FIG. 13, while the mobile terminal is playing the security section 1311 of the video content 1310, if the second input signal 1320 is not sensed anymore, the mobile terminal can end the play of the security section 1311. Namely, while the mobile terminal 1311 is playing the security section 1311, if the second input signal 1320 is not sensed, the mobile terminal can play the video content 1310 again by starting with a point behind a timing point 1312 at which the security section 1311 ends. Moreover, while the mobile terminal does not play the security section 1311 of the video content 1310, if the second input signal 1320 is not sensed anymore, it is a matter of course that the mobile terminal can continue to play the video content 1310 except the security section 1311.

Figure 14:
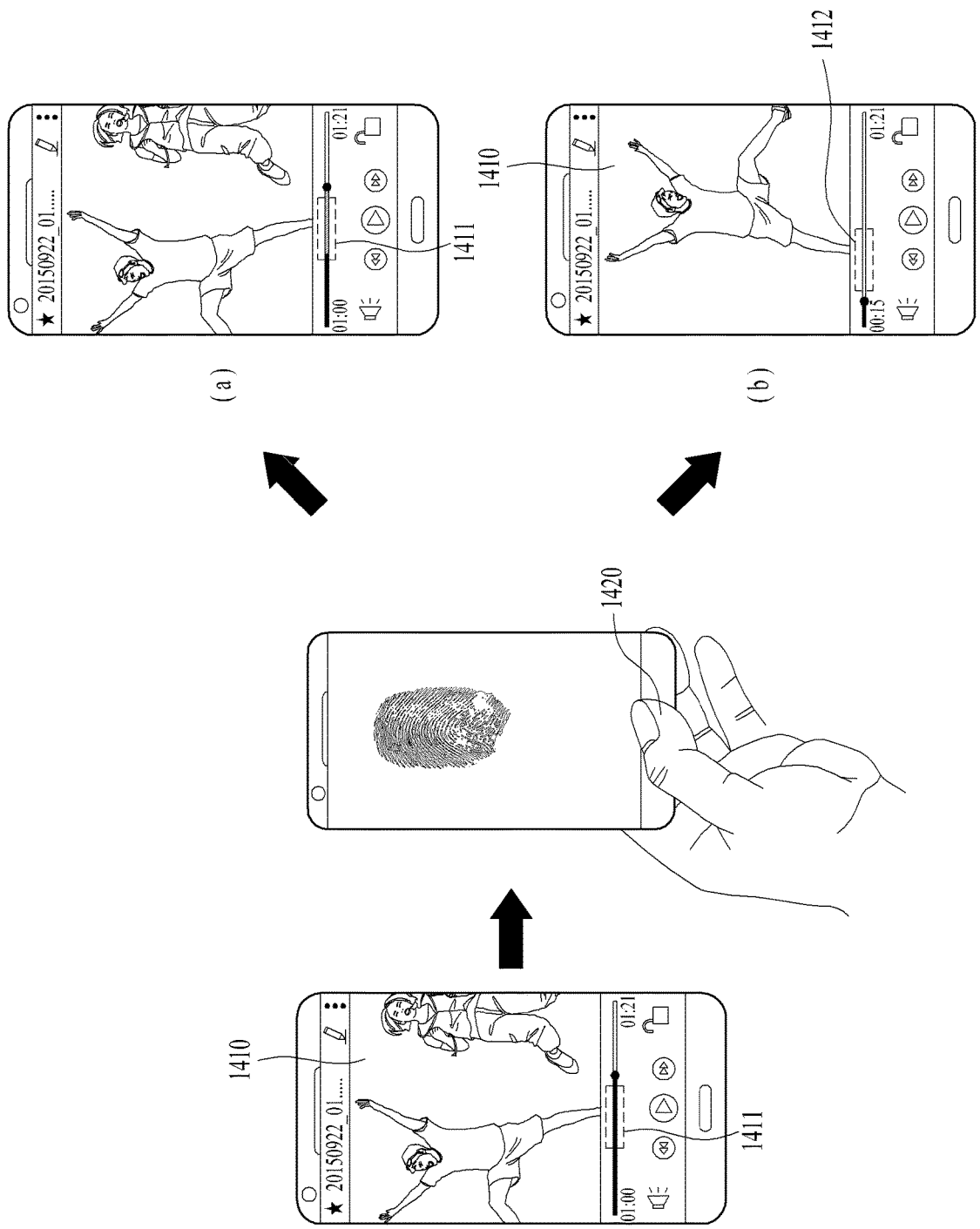
FIG. 14 is a diagram to describe an example of playing a video content including a security section in response to an input signal when playing a video content according to another embodiment of the present invention.

FIG. 14 is a diagram to describe an example of playing a video content including a security section in response to an input signal when playing a video content according to another embodiment of the present invention. In the following, description redundant with FIGS. 5 to 7 and FIG. 13 shall be omitted from the embodiment shown in FIG. 14.

Referring to a first diagram of FIG. 14, a mobile terminal can output a video content 1410. Here, the video content 1410 may correspond to a content including a security section 1411. And, the video content 1410 having the security section 1411 set up therein may correspond to a currently played state. Yet, the mobile terminal may not output the security section 1411 until user authentication through fingerprint recognition is completed.

In doing so, if a currently played position includes a point located ahead of the security section 1411, the mobile terminal can play the video content 1410 by the same method as shown in FIG. 13. Hence, described in the following is a case that a currently played position is includes a point located behind the security section 1411.

While the video content 1410 is played, the mobile terminal can sense a first inpOut signal 1420. Here, the first input signal 1420 may correspond to an input signal of touching a sensing unit provided to a front side of the mobile terminal. The mobile terminal can extract a fingerprint information from the first input signal 1420. If the extracted fingerprint information corresponds to a registered fingerprint, the mobile terminal can display the security section 1411 on a timeline.

For example, as shown in FIG. 14(a), the mobile terminal can maintain a currently played state. Namely, since a currently played position corresponds to a state having passed the security section 1411, although the first input signal 1420 is sensed, the mobile terminal just outputs a presence of the security section 1411 onto the timeline and is able to continue to play the video content in the currently played position.

For another example, as shown in FIG. 14(b), in response to the first input signal 1420, the mobile terminal can play the video content again with reference to a timing point 1412 at which the security section 1411 starts. Namely, although a currently played position corresponds to a position having passed the security section 1411, the mobile terminal can play the security section 1411 from the beginning again in response to the first input signal 1420.

Figure 15:
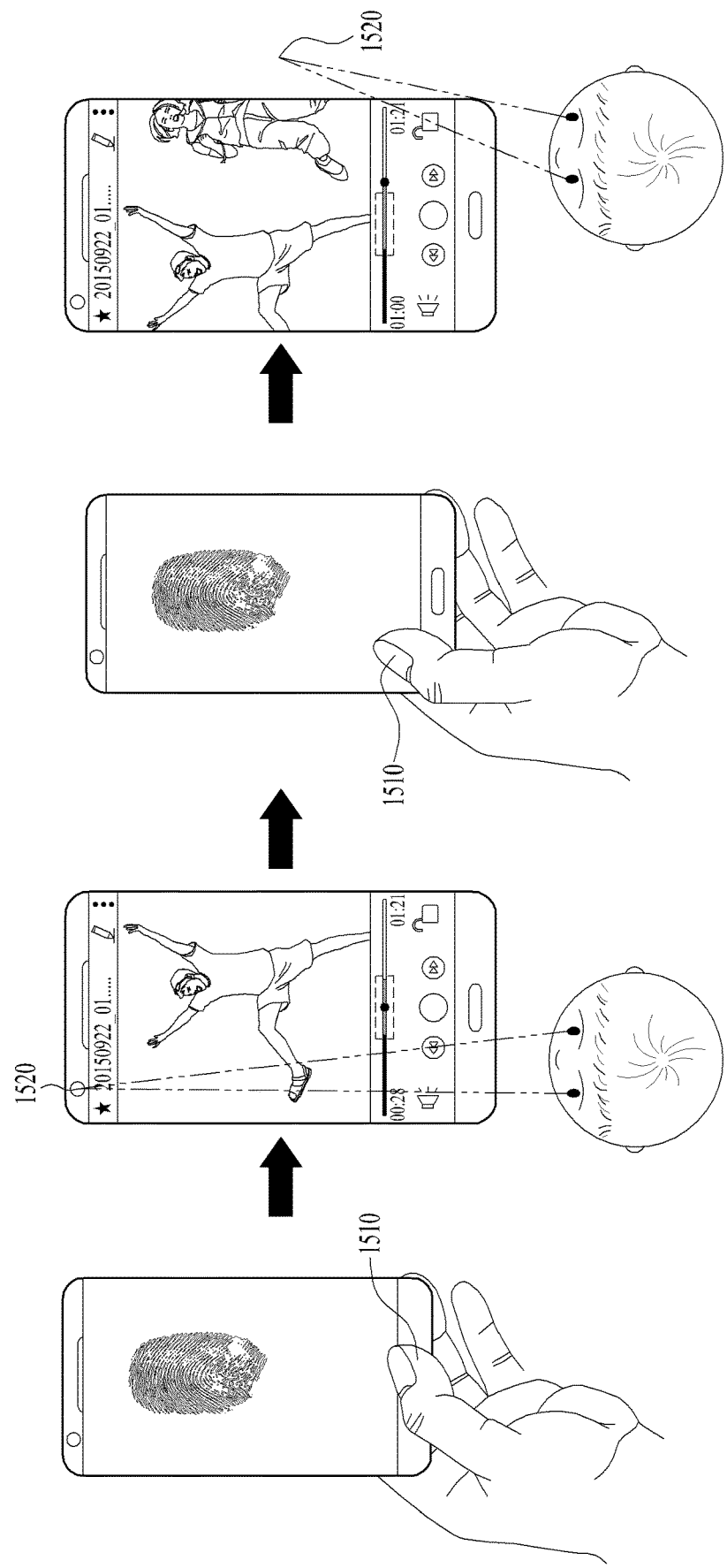
FIG. 15 is a diagram to describe an example of playing a video content including a security section in response to an input signal when playing a video content according to another embodiment of the present invention.

FIG. 15 is a diagram to describe an example of playing a video content including a security section in response to an input signal when playing a video content according to another embodiment of the present invention. Particularly, FIG. 15 shows a method of playing a security section by user's eyes as well as fingerprint information. In the following, description redundant with FIGS. 5 to 9, FIG. 13 and FIG. 14 shall be omitted from the embodiment shown in FIG. 15. And, it is a matter of course that the embodiments shown in FIG. 13 and FIG. 14 are applicable to the embodiment shown in FIG. 15.

Moreover, a first diagram of FIG. 15 corresponds to the second diagram of FIG. 13. Hence, the first diagram of FIG. 15 corresponds to a drawing after the mobile terminal has performed authentication in response to a second input signal according to the first and second drawings of FIG. 13.

Referring to the first diagram of FIG. 15, while a video content is outputted, a mobile terminal can sense a first input signal 1510. Here, the first input signal 1510 may correspond to the second input signal in FIG. 13. Yet, unlike FIG. 11 and FIG. 12, the first input signal 1510 may correspond to a preset touch input signal.

Referring to a second diagram of FIG. 15, if the first input signal 1510 corresponds to a preset touch input signal, the mobile terminal can sense a second input signal 1520. Here, the second input signal 1520 may correspond to a signal generated based on user's eyes sensed by a camera. According to one embodiment of the present invention, while sensing the second input signal 1520, the mobile terminal can play the video content including a security section.

Referring to a third diagram of FIG. 15, although the first input signal 1510 is not sensed, while the second input signal 1520 is sensed, the mobile terminal can play the video content including the security section. Namely, when a security section set-up video content is played, the user can applies an input of a deep press touch to a fingerprint sensing unit provided to a front side of the mobile terminal. As sensing a preset touch input signal, the mobile terminal can sense an input of user's eyes. Hence, the user can watch the video content including the security section while staring at the camera.

Referring to a fourth diagram of FIG. 15, if the second input signal 1520 is not sensed anymore, the mobile terminal can play the video content by excluding the security section like the fifth diagram of FIG. 13. For example, while the mobile terminal is playing the security section of the video content, if the user does not stare at the camera anymore, the mobile terminal may end the play of the security section and play the video content by starting with a point after a timing point of ending the play.

Embodiment of Providing a Video Content Including a Security Section when Attaching the Video Content A user can send a video content to an external device using a mobile terminal. In doing so, if the user inputs a registered fingerprint information, the video content including a security section can be sent to the external device. Regarding this, when a video content is sent to an external device, one example of sending the video content including a security section is described with reference to FIG. 16. In the embodiment shown in FIG. 16, the video content is assumed as a shooting-completed video.

Figure 16:
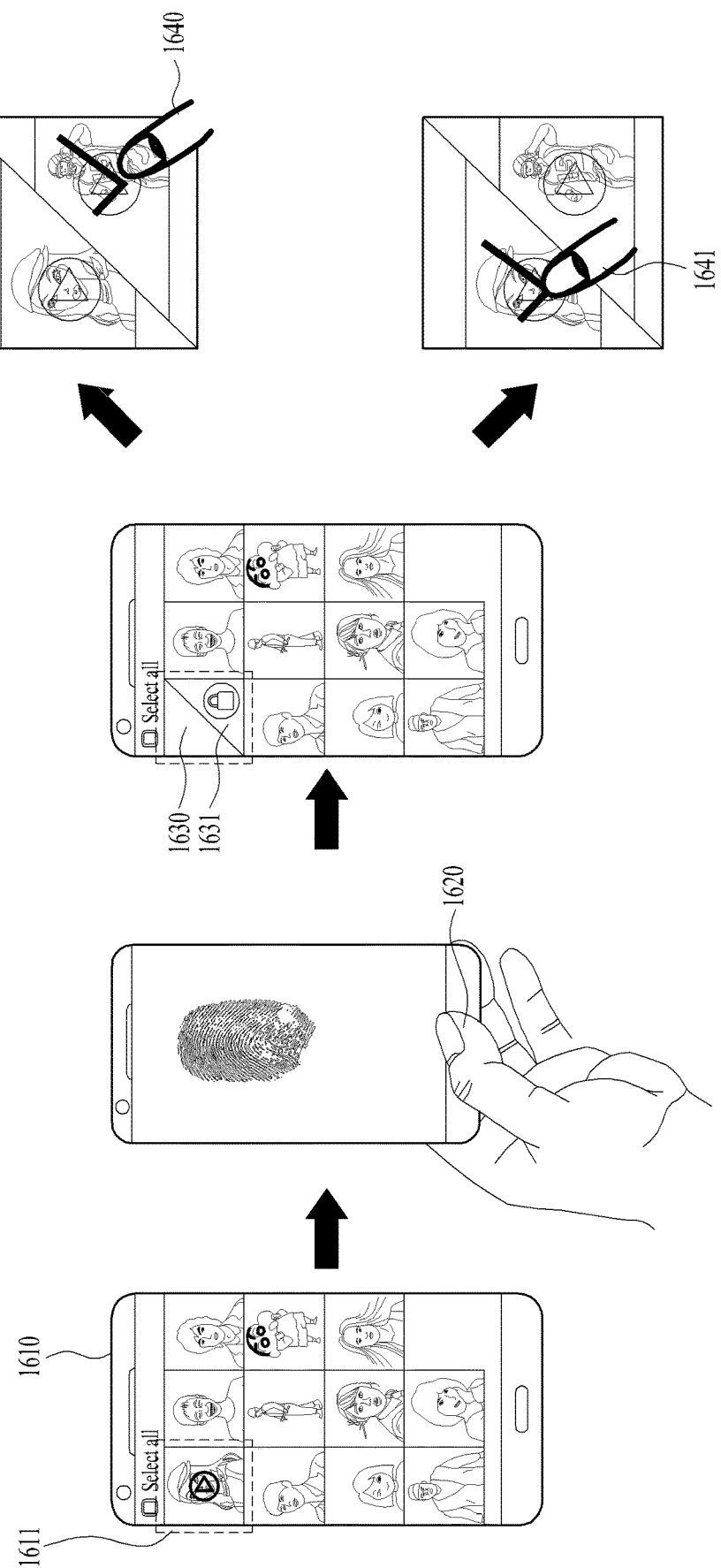
FIG. 16 is a diagram to describe an embodiment of transmitting a video content including a security section in response to an input signal when transmitting a video content according to one embodiment of the present invention.

FIG. 16 is a diagram to describe an embodiment of transmitting a video content including a security section in response to an input signal when transmitting a video content according to one embodiment of the present invention. In the following, description redundant with FIGS. 5 to 7 and FIG. 11 shall be omitted from the embodiment shown in FIG. 16.

Referring to a first diagram of FIG. 16, a mobile terminal can output at least one thumbnail 1610 corresponding to a video content stored in a memory. Here, the at least one thumbnail 1610 may correspond to a thumbnail indicating a section except a security section in the video content. In this case, the mobile terminal may output a thumbnail indicating a section except a security section in a first video content. In the following description, the thumbnail 1611 corresponding to the first video content is taken as an example.

Referring to a second diagram of FIG. 16, while the thumbnail 1611 indicating the section except the security section in the first video content is outputted, the mobile terminal can sense a first input signal 1620. Here, the first input signal 1620 may correspond to an input signal for a fingerprint sensing unit provided to a front side of the mobile terminal. As sensing the first input signal, the mobile terminal may extract a fingerprint information from the first input signal 1620 and then determine whether the extracted fingerprint information corresponds to a registered fingerprint.

Referring to a third diagram of FIG. 16, if the extracted fingerprint information corresponds to the registered fingerprint information, the mobile terminal can output a thumbnail 1630 indicating a section except a security section of the first video content and a thumbnail 1631 indicating the security section of the first video content. Namely, the first to third diagrams of FIG. 14 correspond to the first to third diagrams of FIG. 11.

On the other hand, referring to a fourth diagram of FIG. 16, while the thumbnail 1630 indicating the section except the security section of the first video content and the thumbnail 1631 indicating the security section of the first video content are outputted, the mobile terminal can sense a second input signal 1640/1641. The second input signal 1640/1641 may correspond to a control signal for selecting to transmit the thumbnail 1630 indicating the section except the security section of the first video content or the thumbnail 1631 indicating the security section of the first video content. Here, the second input signal 1640/1641 may correspond to a preset touch input signal. For example, the second input signal 1640/1641 may correspond to a touch input signal such as a long touch, a deep press touch, or the like.

As sensing the second input signal 1640/1641, the mobile terminal can send the first video content to an external device. In doing so, if the second input signal 1640 corresponds to the signal for selecting the thumbnail 1630 indicating the section except the security section of the first video content, the mobile terminal can send the first video content to the external device in a manner of excluding the security section of the first video content. On the other hand, if the second input signal 1641 corresponds to the signal for selecting the thumbnail 1631 indicating the security section of the first video content, the mobile terminal can send the first video content to the external device in a manner that the security section of the first video content is included.

Figure 17:
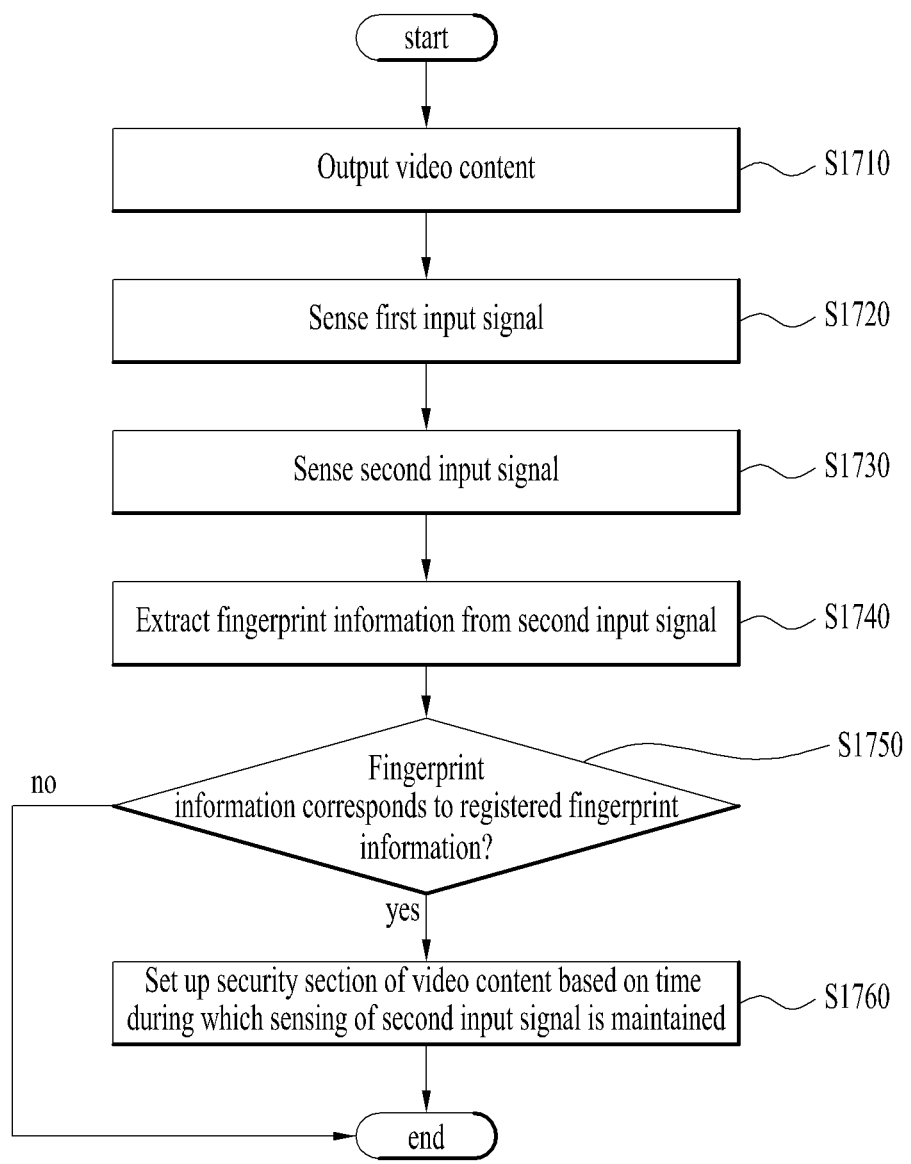
FIG. 17 is a flowchart to describe a method of controlling a mobile terminal according to one embodiment of the present invention.

FIG. 17 is a flowchart to describe a method of controlling a mobile terminal according to one embodiment of the present invention. The respective steps of FIG. 17 mentioned in the following can be controlled by the controller 180 of the mobile terminal shown in FIG. 1A.

In a step S1710, a mobile terminal can output a video content. In doing so, the mobile terminal can output a real-time image sensed through a camera to a display unit. According to an embodiment, the mobile terminal may output a video editing content for editing a video content previously stored in a memory. According to another embodiment, the mobile terminal may output a thumbnail list indicating at least one video content previously stored in the memory.

In a step S1720, while the video content is outputted, the mobile terminal may sense a first input signal. Here, the first input signal may correspond to a signal for shooting, editing or listing a video. For example, the first input signal may correspond to a touch input signal for a video shot icon using a finger of a user of the mobile terminal. Hence, the mobile terminal can start the video shooting. In the following description, an embodiment of shooting a video content is taken as an example.

In a step S1730, while a video is being shot, the mobile terminal may sense a second input signal. Here, the second input signal may correspond to an input signal of touching a fingerprint sensing unit provided to at least one of front and rear sides of the mobile terminal.

In a step S1740, the mobile terminal can extract a fingerprint information from the second input signal. Since the second input signal corresponds to a touch signal using a finger of a user of the mobile terminal, the mobile terminal can extract the fingerprint information from the second input signal by the method shown in FIG. 6 and FIG. 7.

In a step S1750, the mobile terminal can determine whether the extracted fingerprint information corresponds to a registered fingerprint information. If the extracted fingerprint information does not correspond to the registered fingerprint information, the mobile terminal can shoot a video without security section setup.

In a step S1760, if the extracted fingerprint information corresponds to the registered fingerprint information, the mobile terminal can set up a security section of a video content based on a time for which the sensing of the second input signal is maintained. Here, the security section is a section encrypted in the video based on the time for maintaining the sensing of the second input signal and may correspond to at least one partial section of the video content.

Namely, according to one embodiment of the present invention, when a user of a mobile terminal shoots or edits a video, the user can set a prescribed section of a video content as non-disclosure. Hence, the user can play or attach a region set as a security section, through a registered fingerprint information only.

Figure 18:
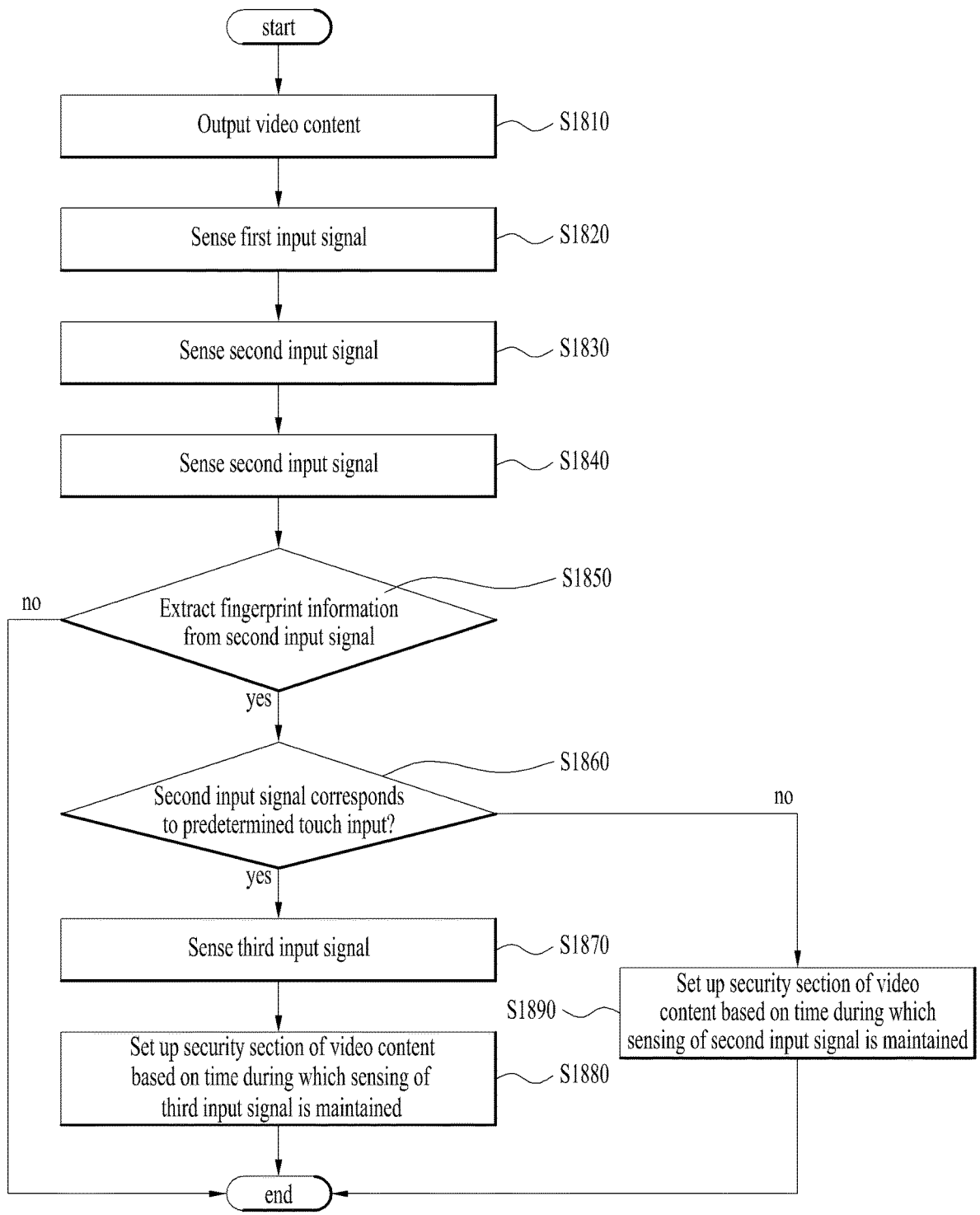
FIG. 18 is a flowchart to describe a method of controlling a mobile terminal according to another embodiment of the present invention.

FIG. 18 is a flowchart to describe a method of controlling a mobile terminal according to another embodiment of the present invention. Particularly, FIG. 18 shows a method of setting up a security section by user's eyes as well as fingerprint information in case of shooting a video content. The respective steps of FIG. 18 mentioned in the following can be controlled by the controller 180 of the mobile terminal shown in FIG. 1A. In the following, description redundant with FIG. 17 shall be omitted from the embodiment shown in FIG. 18.

In a step S1810, a mobile terminal can output a video content. In doing so, the mobile terminal can output a real-time image sensed through a camera to a display unit. The video content may include a content for shooting a real-time image, a content for editing a previously stored video content, or a thumbnail list indicating video contents. In the following description, an embodiment of shooting a video content is taken as an example.

In a step S1820, as sensing a first input signal, the mobile terminal can start the video shooting. Here, the first input signal may correspond to a touch input signal using a finger of a user of the mobile terminal for a video shot icon.

In a step S1830, while a video is being shot, the mobile terminal can sense a second input signal. Here, the second input signal may correspond to an input signal of touching a fingerprint sensing unit provided to at least one of front and rear sides of the mobile terminal.

In a step S1840, the mobile terminal can extract a fingerprint information from the second input signal.

In a step S1850, the mobile terminal can determine whether the extracted fingerprint information corresponds to a registered fingerprint information. If the extracted fingerprint information does not correspond to the registered fingerprint information, the mobile terminal can shoot a video without security section setup.

In a step S1860, if the extracted fingerprint information corresponds to the registered fingerprint information, the mobile terminal can determine whether the second input signal corresponds to a preset touch input signal. Here, the preset touch input signal may include a long touch, a deep press touch and the like. If the second input signal corresponds to the preset touch input signal, the mobile terminal performs a step S1870. If not, the mobile terminal can perform a step S1890.

In the step S1870, if the second input signal corresponds to the preset touch input signal, the mobile terminal can sense a third input signal. Here, the third input signal may correspond to a signal generated based on user's eyes sensed by a front camera.

In a step S1880, the mobile terminal can maintain the security section setup of the video content based on a time for which the sensing of the third input signal is maintained. Hence, although the sensing of the second input signal is not maintained, the mobile terminal can continue to set up the security section of the video content while the sensing of the third input signal is maintained. For example, in the course of shooting a video content, the user may apply a deep press touch to the fingerprint sensing unit provided to the front side of the mobile terminal and then stare at the camera provided to the front side of the mobile terminal. In this case, the mobile terminal can sense an input of user's eyes in response to a preset touch input signal. And, the mobile terminal can maintain the security section set-up of the video content while the user is staring at the camera.

In a step S1890, if the second input signal does not correspond to the preset touch input signal, the mobile terminal can set up a security section of the video content based on a time for maintaining the sensing of the second input signal. Hence, if the sensing of the second input signal ends, the security section setup of the video content may end as well. For example, a user may touch the fingerprint sensing unit provided to the front side of the mobile terminal in the course of shooting the video content, whereby the mobile terminal can set up a security section of the video content while the user's touch input is maintained. Therefore, when the user detaches a hand from the fingerprint sensing unit, the mobile terminal can end the security section setup of the video content.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. Thus, it is intended that the present invention covers the modifications and variations of this invention that come within the scope of the appended claims and their equivalents.

INDUSTRIAL APPLICABILITY

The present invention has industrial applicability in a mobile terminal and is repetitively applicable.

What is claimed is:
1. A mobile terminal, comprising:
a display unit;
a memory;
a sensing unit configured to sense a fingerprint input;
a first camera; and
a controller configured to:
sense a first input signal in a state that a first video content captured through the first camera is output on the display unit,
extract a first fingerprint information from the first input signal, and
set up a security section of the first video content captured through the first camera in response to the first fingerprint information corresponding to a registered fingerprint information,
wherein the security section comprises a section in which at least one portion of the first video content captured through the first camera is encrypted based on a time during which the sensing of the first input signal is maintained, and
wherein the controller is further configured to:

extract a second fingerprint information in response to a second input signal being sensed before or while the first video content in which the security section is set up is played,
in response to the second fingerprint information corresponding to the registered fingerprint information, play the first video content including the security section, and
in response to the second fingerprint information not corresponding to the registered fingerprint information, play the first video content except the security section.

2. The mobile terminal of claim 1, wherein the first video content corresponds to a preview video captured through the first camera.

3. The mobile terminal of claim 1, wherein the controller is configured to display a security indicator on the display unit while the security section is output.

4. The mobile terminal of claim 1, further comprising:
a second camera configured to sense a user's eyes,
wherein in response to the first input signal corresponding to a preset touch input, the controller is configured to sense a third input signal corresponding to a signal generated based on the user's eyes, and
wherein the controller is configured to set up the security section while the third input signal is sensed.

5. The mobile terminal of claim 4, wherein the controller is configured to set up the security section while the third input signal is sensed in a state that the first input signal is not maintained.

6. The mobile terminal of claim 1, wherein the controller is configured to sense the first input signal while a second video content including at least one menu for editing the first video content is displayed on the display unit, and
wherein the first video content corresponds to a video captured through the first camera and stored in the memory.

7. The mobile terminal of claim 6, wherein the at least one menu for editing the first video content includes a timeline.

8. The mobile terminal of claim 7, wherein the controller is configured to sense a third input signal for the timeline and set up a security section based on a position at which the third input signal is sensed.

9. The mobile terminal of claim 1, wherein the controller is configured to sense a third input signal while at least one thumbnail corresponding to a video stored in the memory is displayed on the display unit,
wherein the at least one thumbnail includes a thumbnail indicating a section except the security section in the first video content, and
wherein the controller is configured to:
extract a third fingerprint information from the third input signal, and
display a thumbnail indicating the section except the security section of the first video content and a thumbnail indicating the security section of the first video content on the display unit, in response to the third fingerprint information corresponding to the registered fingerprint information.

10. The mobile terminal of claim 9, wherein the controller is configured to:
in response to the third input signal corresponding to a preset touch input, sense a fourth input signal correspond to a signal generated based on a user's eyes, and
while the fourth input signal is sensed, display the thumbnail indicating the section except the security section of the first video content and the thumbnail indicating the security section of the first video content.

11. The mobile terminal of claim 1, wherein the controller is configured to:
in response to the second input signal corresponding to a preset touch input, sense a third input signal corresponding to a signal generated based on a user's eyes, and
while the third input signal is sensed, play the first video content including the security section.

12. The mobile terminal of claim 1, further comprising:
a wireless communication unit configured to transmit and receive contents with an external device,
wherein the controller is configured to:
sense a third input signal, while at least one thumbnail corresponding to a video stored in the memory is displayed on the display unit, wherein the at least one thumbnail includes a thumbnail indicating the security section of the first video content and a thumbnail indicating a section except the security section of the first video content,
in response to the third input signal selecting the thumbnail indicating the security section of the first video content, transmit the first video content including the security section to the external device, and
in response to the third input signal selecting the thumbnail indicating the section except the security section of the first video content, transmit the first video content except the security section to the external device.

13. A method of controlling a mobile terminal, the method comprising:
sensing a first input signal in a state that a first video content captured through a first camera of the mobile terminal is output on a display unit of the mobile terminal;
extracting, via a controller of the mobile terminal, a first fingerprint information from the first input signal; and
setting up, via the controller, a security section of the first video content captured through the first camera in response to the first fingerprint information corresponding to a registered fingerprint information,
wherein the security section comprises a section in which at least one portion of the first video content captured through the first camera is encrypted based on a time during which the sensing of the first input signal is maintained, and
wherein the method further comprises:
extracting a second fingerprint information in response to a second input signal being sensed before or while the first video content in which the security section is set up is played;
in response to the second fingerprint information corresponding to the registered fingerprint information, playing the first video content including the security section; and
in response to the second fingerprint information not corresponding to the registered fingerprint information, playing the first video content except the security section.

14. The method of claim 13, wherein the first video content corresponds to a preview video captured through the first camera.

15. The method of claim 13, further comprising:
displaying a security indicator on the display unit while the security section is output.

16. The method of claim 13, further comprising:
in response to the first input signal corresponding to a preset touch input, sensing a third input signal corresponding to a signal generated based on a user's eyes sensed via a second camera of the mobile terminal, and
setting up the security section while the third input signal is sensed.

17. The method of claim 16, further comprising:
setting up the security section while the third input signal is sensed in a state that the first input signal is not maintained.

\* \* \* \* \*